United States Patent [19]
Kikuchi et al.

[11] Patent Number: 5,886,841
[45] Date of Patent: Mar. 23, 1999

[54] APPARATUS AND METHOD FOR COPYING DATA BETWEEN TAPE STREAMERS WHICH PROVIDES AN INDICATION OF A DIFFERENCE IN THE AMOUNT OF DATA REQUESTED TO BE COPIED AND THE AMOUNT OF DATA SENT

[75] Inventors: Akihiro Kikuchi; Tsuyoshi Nishio, both of Kanagawa, Japan

[73] Assignee: Sony Corporation, Tokyo, Japan

[21] Appl. No.: 727,625

[22] PCT Filed: Feb. 20, 1996

[86] PCT No.: PCT/JP96/00376

§ 371 Date: Oct. 23, 1996

§ 102(e) Date: Oct. 23, 1996

[87] PCT Pub. No.: WO96/26483

PCT Pub. Date: Aug. 29, 1996

[30] Foreign Application Priority Data

Feb. 24, 1995 [JP] Japan ..................................... 7-061758

[51] Int. Cl.[6] ........................................................ G11B 5/09
[52] U.S. Cl. .................................. 360/48; 360/15; 386/52
[58] Field of Search ............................... 360/48, 74.4, 31, 360/51, 39, 15, 46, 73.02; 369/59, 48, 47; 395/404, 497.01, 497.02, 497.03, 497.04, 877, 825; 711/111; 386/4, 52

[56] References Cited

U.S. PATENT DOCUMENTS

| | | | |
|---|---|---|---|
| 4,115,819 | 9/1978 | Shigeta | 360/74.4 X |
| 4,586,093 | 4/1986 | Fukuju et al. | 360/73.02 |
| 4,675,807 | 6/1987 | Gourneau et al. | 395/825 |
| 5,210,829 | 5/1993 | Bitner | 360/31 X |
| 5,321,558 | 6/1994 | Tackett | 360/48 X |
| 5,701,212 | 12/1997 | Tajima | 360/51 |
| 5,712,740 | 1/1998 | Kikuchi et al. | 360/48 |

*Primary Examiner*—Aristotelis Psitos
*Assistant Examiner*—Patrick Wamsley
*Attorney, Agent, or Firm*—Frommer Lawrence & Haug, LLP; William S. Frommer

[57] ABSTRACT

A copy command corresponding to a SCSI protocol is issued from a host computer 101 to a destination data recorder 102r through a SCSI bus 76. The recorder 102r that has received the copy command from the host 101 sends a one-byte read command corresponding to the SCSI protocol to a source data recorder 102t. If the size of a block to be sent is not one byte, the difference is sent as an error byte to the source recorder 102t.

19 Claims, 19 Drawing Sheets

Fig. 17
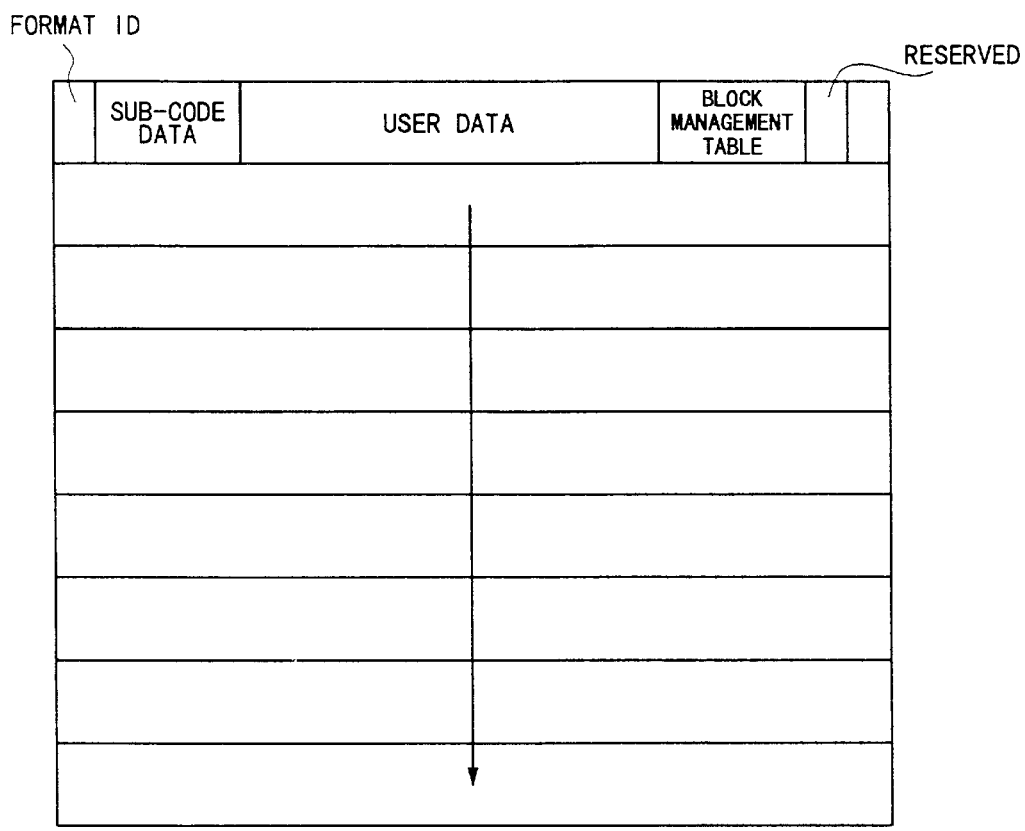
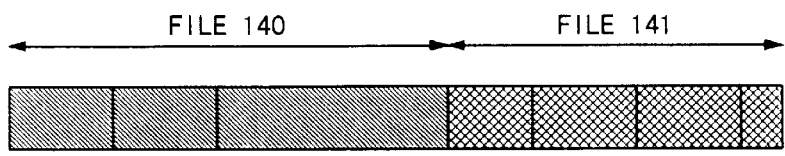
Fig. 18A
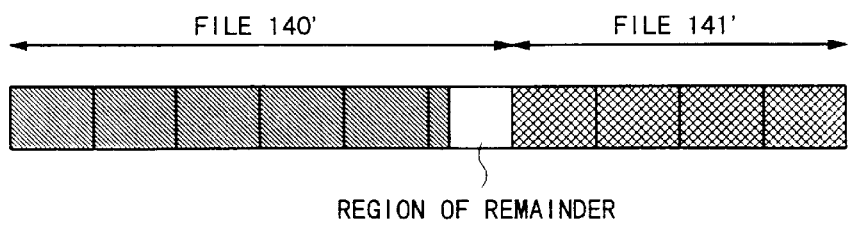
Fig. 18B

Fig. 19A
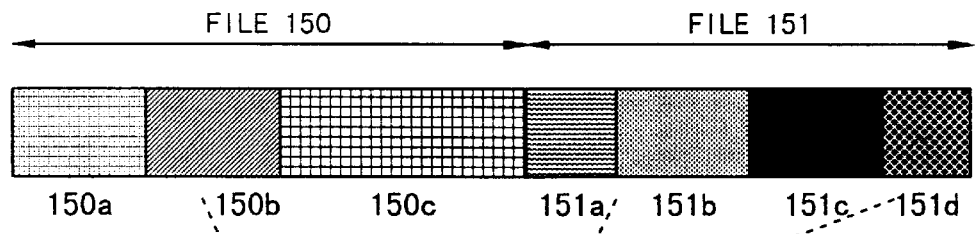
Fig. 19B
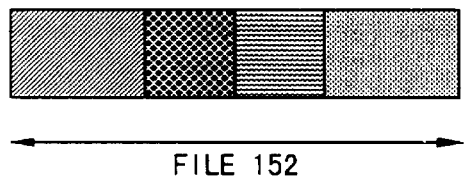
Fig. 19C
| FILE NUMBER | 1 |
|---|---|
| BLOCK NUMBER | 2 |
| NUMBER OF BLOCKS | 1 |
| FILE NUMBER | 2 |
| BLOCK NUMBER | 4 |
| NUMBER OF BLOCKS | 1 |
| FILE NUMBER | 2 |
| BLOCK NUMBER | 1 |
| NUMBER OF BLOCKS | 2 |

APPARATUS AND METHOD FOR COPYING DATA BETWEEN TAPE STREAMERS WHICH PROVIDES AN INDICATION OF A DIFFERENCE IN THE AMOUNT OF DATA REQUESTED TO BE COPIED AND THE AMOUNT OF DATA SENT

TECHNICAL FIELD

The present invention relates to a digital data copying apparatus for coping a large amount of sequential data particularly using a tape streamer for recording digital data on a magnetic tape.

BACKGROUND ART

At present time, as the capacity of data to be processed increases, the necessity for a data recording apparatus that records data on a magnetic tape is increasing. Unlike with a disk type recording medium, data is almost sequentially recorded on a magnetic tape type recording medium.

Now, assume an example that there are two tape streamers and that data is exchanged therebetween (for example, data is copied therebetween). As a prevailing method performed a the present time, data is copied between the two tap streamers through a host computer as shown in FIG. 20. When data is copied from a data recording device (hereinafter referred to as a device) 202 to a device 203, he host computer 200 reads data from the device 20 and stores the data to a buffer memory (not shown) of the host computer 200 through a bus 201. The host computer 200 causes the data stored in the buffer memory to be sent to the device 203 through the bus 201 and then the data to be written to a record medium of the device 203.

As another method, a protocol such as the SCSI system that has a data copy command in the command system is known. When data is copied from a device 206 to a device 205 corresponding to the protocol, as shown in FIG. 21, a host computer 204 causes a copy command to be sent to the device 205 through a SCSI bus 207. The device 205 that has received the copy command sends a read command to the device 206. Thus, data stored in the device 206 is automatically sent to the device 205 through the SCSI bus 207 and then written to a record medium of the device 205.

In the copying method using the host computer, since data is sent through the memory of the host computer, the memory resource of the computer and the CPU resource for data input/output commands are wasted. In addition, since data flows in the bus twice, the transmission rate of the data becomes around ½. Moreover, since the process speeds of the devices are satisfactorily high, the process speeds of data that is input/output to/from the host computer affect the data transmission speeds.

Furthermore, data is sent with an unit named a block. The block is a set of data with a predetermined size. A file is composed of a plurality of blocks. When data is sent through the host computer, the block size of the data is restricted by for example the size of the buffer memory of the host computer. Thus, the image of a data block on the copy source side becomes different from the image of a data block on the copy destination side. Consequently, an application that uses a block image of a file is adversely affected.

On the other hand, in the case that the protocol that has a data copy command in the command system as with the above-described SCSI system, the problems involved in the method using the host computer (for example, the problems of the waste of the CPU resources and the data transmission speeds) are solved. However, in this case, a block image cannot be stored as it is.

Devices that perform a copy operation are for example a block device (such as a disk unit) and a sequential device (such as a magnetic tape unit). In the block device, logical blocks of data are controlled as the conception of sectors. Thus, the block size is fixed. When data is copied between devices with the same sector length, it is not necessary to consider the block size. In other words, when data is copied between block devices such as disk units, a sector image is simply copied as in many real examples.

On the other hand, in the sequential device, data is recorded as variable length blocks. In other words, the amount of data being recorded varies block by block. As an example, 100 bytes of data, 50 bytes of data, and 1024 bytes of data are recorded in the first data block, the second data block, and the third data block, respectively. The images of blocks vary corresponding to the sizes of data. Thus, when data is copied by sequential devices, it is difficult to handle the variable length blocks.

When data is sent in a computer system, only data is sent. However, management data such as a data size and a block size is not sent. Thus, the data receiving side should create such management data. Since the sequential device cannot determine the block size unless it has read all data because data is sent as variable length blocks, the data may not be correctly sent.

For example, assume a device that has a plurality of data regions and a plurality of block management tables in the buffer memory as shown in FIG. 22. In addition, assume that a block management table stores for example a data start position, information that represents whether or not the data is at the beginning or in the middle of a particular block, the length of data managed by the table, and the full size of blocks. In particular, after all blocks have been sent, the information of the size of all blocks is obtained. Corresponding to the information stored in the block management table, the structure of the entire blocks of data stored in individual data regions is obtained.

In this structure, when a block excluding the block management table is written to the buffer memory, the block can be correctly restored corresponding to information written to the block management table.

However, when blocks that exceed the buffer size are written (namely, when the block size exceeds the buffer size), as shown in FIG. 23, before the block management table is created, the data is sent from the buffer. In addition, even if the block size is smaller than the buffer size, as shown in FIG. 24, when blocks are partly stored in the data region, the similar situation takes place. In this example, when blocks that are larger than ⅔ of the buffer size are sent, the buffer gets overflowed. Thus, before the block management table is created, the data is sent.

This is because data to be sent is composed of variable length blocks, unless all data has been read, the block size cannot be obtained and the available buffer size cannot be assured. Thus, when data is sent from the buffer before the block management table is created, data cannot be accurately restored.

DISCLOSURE OF THE INVENTION

Thus, an object of the present invention is to provide a digital data copying apparatus that can copy data of variable length blocks as the same block image.

To solve the above-described problem, the present invention is a digital data copying apparatus having tape streamers for recording digital data processed by a computer or reproducing digital data so as to directly send/receive the digital data to/from the computer, the apparatus comprising a host computer, a first tape streamer for receiving a copy command from the host computer, and a second tape streamer for receiving from the first tape streamer a command for sending a relatively small amount of data, the minimum unit of the relatively small amount of data being one byte, wherein the second tape streamer is adapted for sending information of the difference between the amount of data to be copied and the relatively small amount of data to the first tape streamer, and wherein the first tape streamer is adapted for storing the amount of data to be copied to a temporarily storing device corresponding to the information of the difference and recording the data on a tape record medium.

Thus, according to the above-described structure, since the block size can be obtained before data is read, even if blocks that exceed the buffer size are sent, a block management table can be created. Thus, data can be copied with the same block image.

BRIEF DESCRIPTION OF DRAWINGS

FIG. 17 is a schematic diagram showing a state of a band memory that is filled with data of one byte being read;

FIG. 18 shows schematic diagrams for explaining a converting operation from variable length blocks to fixed length blocks;

FIG. 19 shows schematic diagrams for explaining a file editing operation performed block by block;

BEST MODES FOR CARRYING OUT THE INVENTION

Figure 1:
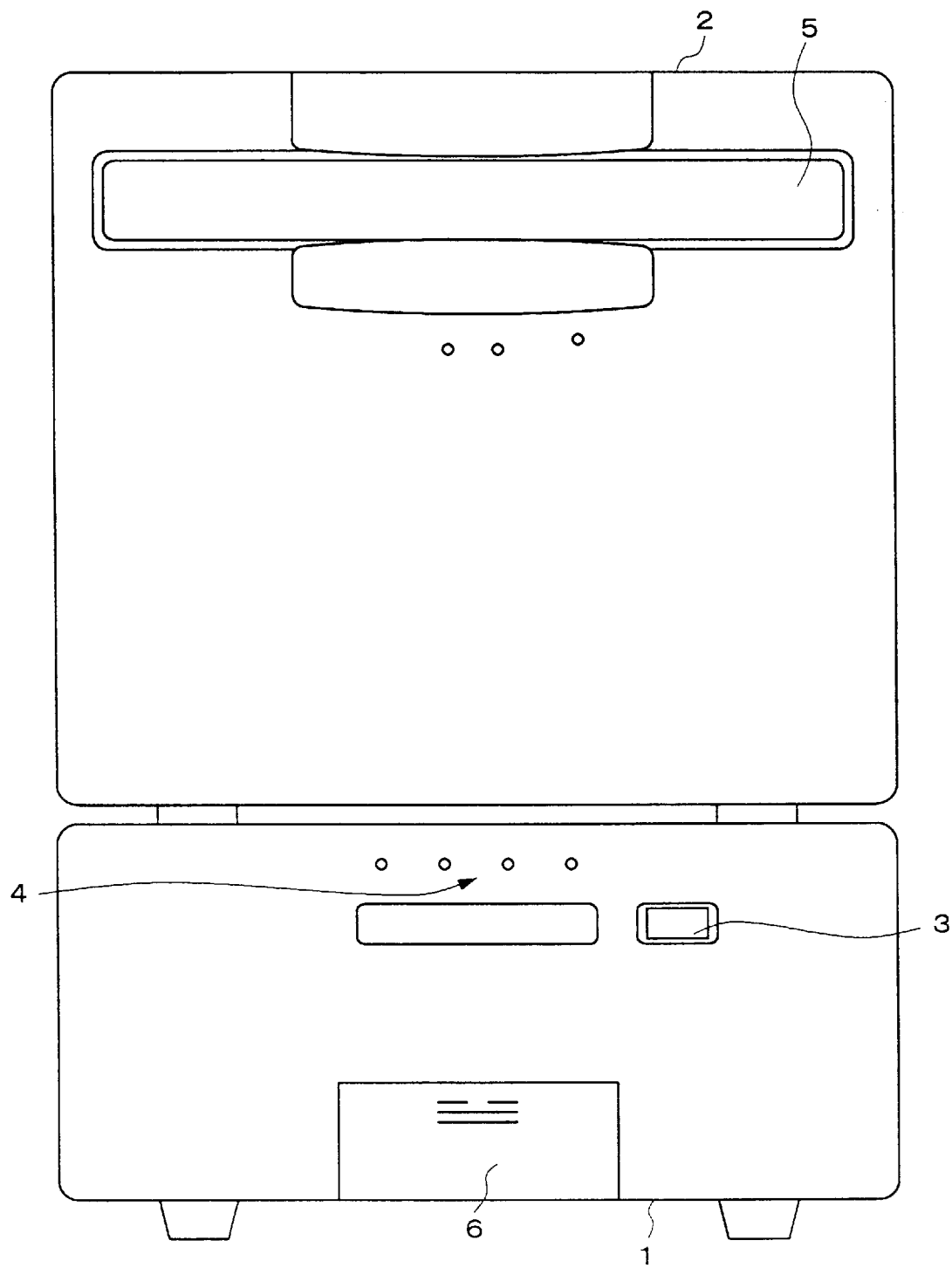
FIG. 1 is a front view schematically showing a tape streamer according to the present invention.
Figure 2:
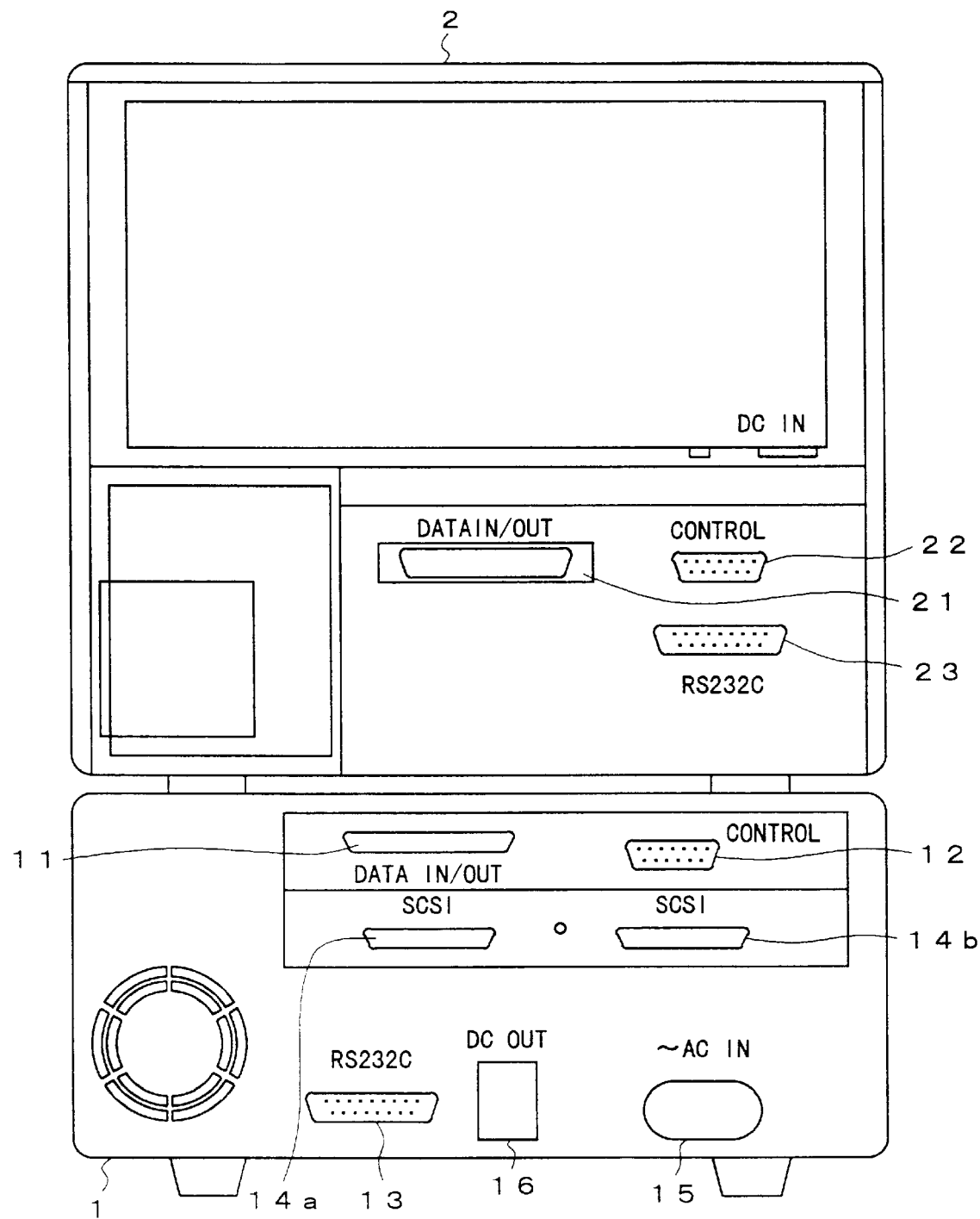
FIG. 2 is a rear view schematically showing the tape streamer according to the present invention.

Before explaining an embodiment of the present invention, a tape streamer according to the present invention will be described. The tape streamer records/reproduces digital data on/from a cassette tape with a rotating head. FIG. 1 is a front view showing the tape streamer. FIG. 2 is a rear view showing the tape streamer.

As shown in the drawings, the tape streamer is composed of an upper unit and a lower unit that are a tape drive controller 1 and a digital information recorder 2. A button 3 that is used for loading/unloading the cassette tape and a plurality of light emitting diodes 4 that display a cassette tape loading state, a power ON state, and so forth are disposed on the front panel of the tape drive controller 1. A cassette tape loading opening 5 is disposed on the front panel of the digital information recorder 2. In addition, other buttons are disposed inside a closable panel 6.

As shown in FIG. 2, a plurality of connectors are disposed on the rear surfaces of the tape drive controller 1 and the digital information recorder 2. The tape drive controller 1 as the lower unit has a tape input/output connector 11, a control connector 12, an RS232C connector 13, two SCSI connectors 14a and 14b, an AC power input connector 15, and a DC power output connector 16.

On the other hand, the digital information recorder 2 has a data input/output connector 21, a control connector 22, and an RS232C connector 23. By connecting a predetermined connection cable of the digital information recorder 2 to the DC power output connector 16 of the tape drive controller 1, the DC power of the tape drive controller 1 is supplied to the digital information recorder 2. The data input/output connectors 11 and 21 are connected with a predetermined cable. Thus, data is exchanged between the controller 1 and the recorder 2. The control connectors 12 and 22 are connected with a predetermined cable. Thus, control signals are exchanged between the controller 1 and the recorder 2. The RS-232C connectors 13 and 23 are used for diagnosing the controller 1 and the recorder 2, respectively.

Figure 3:
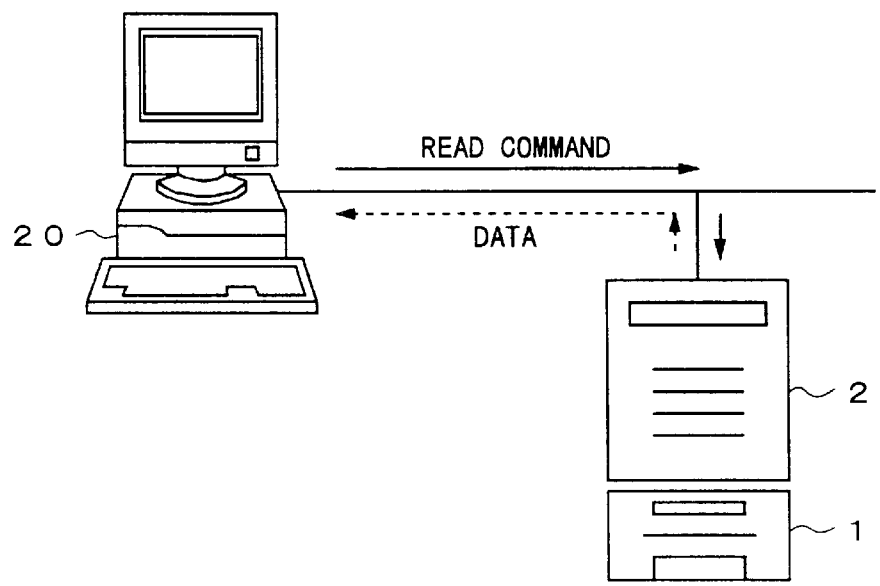
FIG. 3 is a schematic diagram showing an example of the use of the tape streamer according to the present invention.
Figure 4:
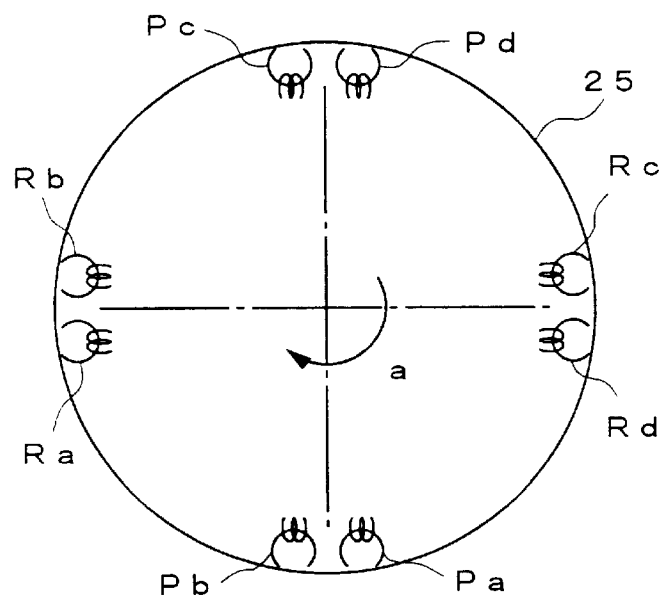
FIG. 4 is a schematic diagram showing positions of heads of the tape streamer according the present invention.

When the tape streamer is connected to a host computer 20, the SCSI connectors 14a and 14b are used as shown in FIG. 3. When a read command is sent from the host computer 20 to the tape streamer, the tape streamer outputs data to the host computer 20. The digital information recorder 2 records/reproduces digital data on/from a cassette tape with a rotating head. FIG. 4 shows an example of the positions of heads of the recorder 2. In FIG. 4, four recording heads Ra, Rb, Rc, and Rd and four reproducing (playback) heads Pa, Pb, Pc, and Pd are disposed on a drum that rotates at a predetermined speed.

The heads Ra and Rb are disposed at adjacent positions. Likewise, pairs of the heads Rc and Rd, the heads Pa and Pb, and the heads Pc and Pd are disposed at respective adjacent positions. The extended direction of the gap of one pair member is different from the extended direction of the gap of the other pair member (this extended direction is referred to as azimuth). The heads Ra and Rc oppositely disposed at an interval of 180° each have a first azimuth. The heads Rb and Rd oppositely disposed at an interval of 180° each have a second azimuth. The heads Pa and Pc oppositely disposed at an interval of 180° each have a first azimuth. The heads Pb and Pd oppositely disposed at an interval of 180° each have a second azimuth. With the different azimuths, a crosstalk between adjacent tracks can be prevented. Each pair of two adjacent heads is actually accomplished as an integrated head referred to as a double-azimuth head.

A tape (for example ½ inch-width tape) pulled out from the cassette is wound on the peripheral surface of the drum 25 at an angle of 180° or more. The tape is fed at a predetermined speed. Thus, when a signal is recorded on the tape, at the first half period of one rotation of the drum 25, the heads Ra and Rb scan the tape. At the second half period of the rotation, the heads Rc and Rd scan the tape. When a signal is reproduced from the tape, at the first half period of one rotation of the drum 25, the heads Pa and Pb scan the tape. At the second half period of the rotation, the heads Pc and Pd scan the tape.

Figure 5:
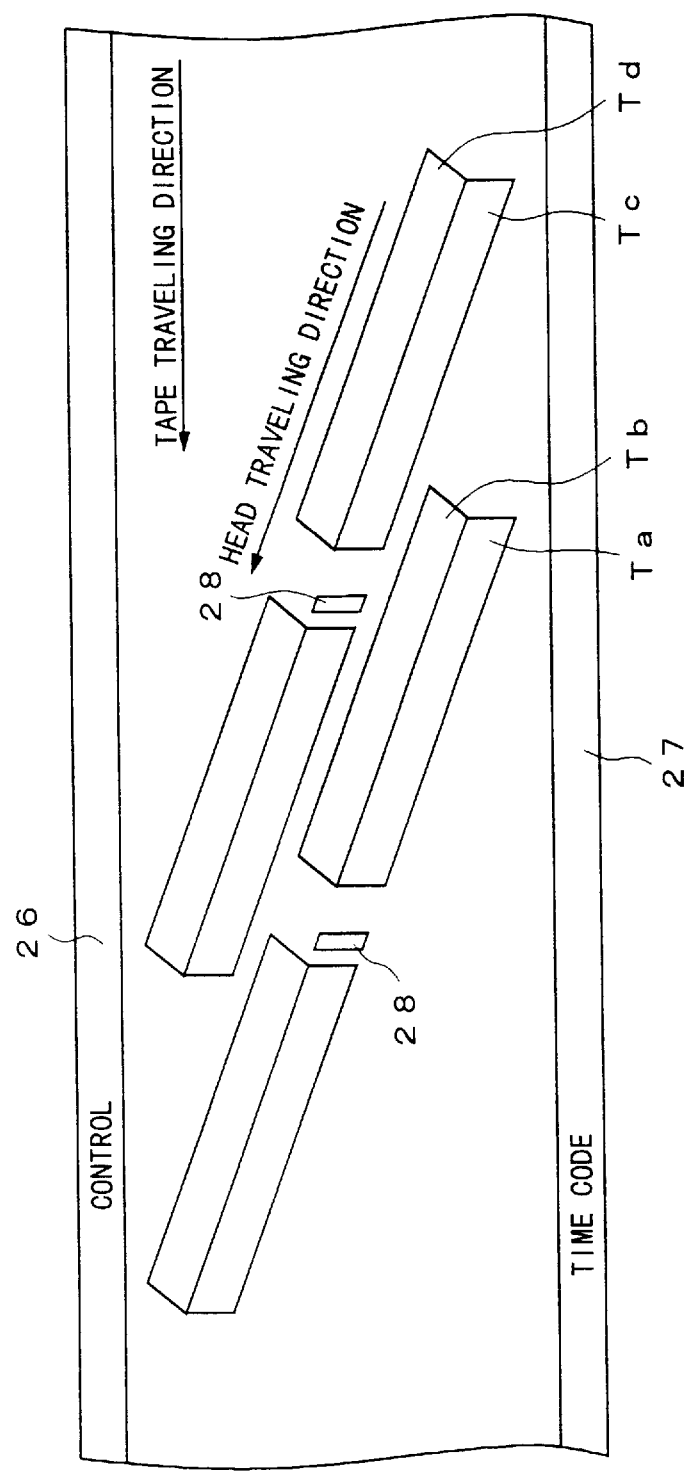
FIG. 5 is a schematic diagram showing a track pattern of the tape streamer according to the present invention.

FIG. 5 shows a track pattern on the tape of the digital information recorder 2. Upper and lower longitudinal tracks are formed in the width direction of the tape. Helical tracks are formed between the upper and lower longitudinal tracks. A control signal is recorded on the upper longitudinal track 26. A time code is recorded on the lower longitudinal track 27. The time code represents the longitudinal position of the tape. For example, SMPTE time code is used. With one rotation of the drum 25, the heads Ra and Rb form two helical tracks Ta and Tb at the same time. Thereafter, the heads Rc and Rd form two helical tracks Tc and Td at the same time. The first half portion and the second half portion of each helical track are separately formed. A tracing pilot signal recording area 28 is formed between the first half portion and the second half portion.

The SMPTE time code was developed for a video signal for a VTR or the like. The minimum unit of the SMPTE time code is a frame (1/30 seconds). As will be described later, in the tape streamer, data that can be recorded on the four tracks Ta to Td shown in FIG. 5 is a unit of logical data (referred to as a track set). When 16 tracks correspond to one frame of a video signal, with a lower digit (values 0, 1, 2, and 3) than the frame digit of the time code, a time code of which one unit is composed of 16 tracks should be used (the time code is also referred to as ID). In the tape streamer according to the present invention, the SMPTE time code is used in such a manner that one track set is composed of four tracks. With a user data area of the SMPTE time code, such a modification can be performed.

Figure 6:
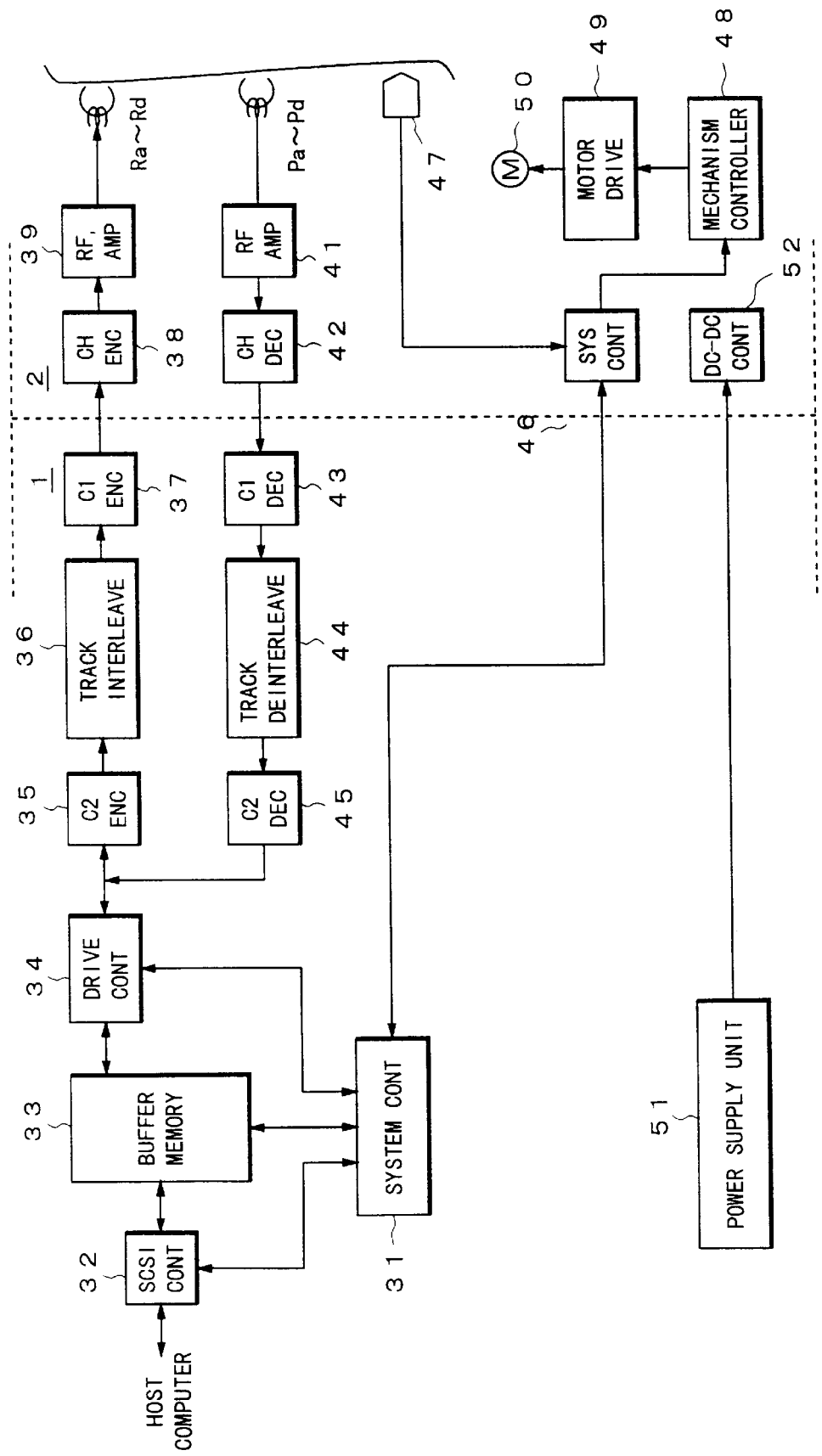
FIG. 6 is a block diagram showing a system structure of the tape streamer according to the present invention.

FIG. 6 schematically shows a system structure of the tape drive controller 1 and the digital information recorder 2. The main functions of the system controller 31 of the controller 1 are as follows:

managing a SCSI controller 32,
managing a buffer memory 33,
managing a file/managing a table,
controlling the write, read, and retry operations of data,
controlling the digital information recorder 2, and
performing the self-diagnosing operation.

The system is connected to the host computer through the SCSI controller 32. A drive controller 34 is disposed between the buffer memory 33 and the tape drive controller. Data read from the buffer memory 33 is supplied to a C2 encoder 35 through the drive controller 34. A track interleaving circuit 36 and a C1 encoder 37 are connected to the C2 encoder 35.

The C2 encoder 35 and the C1 encoder 37 perform an error-correction-code encoding process using a product code for record data. The track interleaving circuit 36 controls the distribution of data recorded on tracks so as to improve the correction performance of an error that takes place in the recording/reproducing processes.

Since data is recorded on the tape in the unit of a sync block separated by a synchronous signal, the track interleaving circuit 36 adds a block synchronous signal to data. The C1 encoder 37 generates a C1 parity, randomizes data, and performs the interleaving process for a word in a plurality of sync blocks.

Digital data is supplied from the C1 encoder 37 to the digital information recorder 2. The digital information recorder 2 encodes the digital data received from a channel-code encoder 38 and outputs the encoded data as record data to the recording heads Ra to Rd through an RF amplifier 39. The heads Ra to Rd record the data on a tape. The RF amplifier 39 lowers the frequency band of the record signal and performs a process for the record signal corresponding to a partial response class 4 (PR $(1, 0, -1)$) so as to easily detect a reproduction signal.

Data reproduced from the tape by the reproducing heads Pa to Pd is supplied to a channel-code decoder 42 through an RF amplifier 41. The RF amplifier 41 has a reproducing amplifier, an equalizer, a Viterbi decoder, and so forth. An output signal of the channel-code decoder 42 is sent to the tape drive controller 1 and then a C1 decoder 43.

A track deinterleaving circuit 44 is connected to the C1 decoder 43. A C2 decoder 45 is connected to the deinterleaving circuit 44. The C1 decoder 43, the track deinterleaving circuit 44, and the C2 decoder 45 perform the reverse operations of the C1 encoder 37, the track deinterleaving circuit 36, and the C2 encoder 35, respectively. The reproduced (read) data received from the C2 decoder 45 is supplied to the buffer memory 33 through the drive controller 34.

The digital information recorder 2 has a system controller 46. In addition, the digital information recorder 2 has a fixed head 47 for the longitudinal tracks of the magnetic tape 65. The head 47 is connected to the system controller 46. The head 47 records/reproduces the control signal and the time code. The system controller 46 is connected to a system controller 31 of the tape drive controller 1 through a bidirectional bus.

A mechanism controller 48 is connected to the system controller 46. The mechanism controller 48 has a servo circuit. The servo circuit drives a motor 50 through a motor driving circuit 49. The system controller 46 has for example two CPUs that control a communication with the tape drive controller 1, perform recording/reproducing operations of the time code, timings of signal recording/reproducing operations, and so forth.

The mechanism controller 48 has for example two CPUs that control a mechanical system of the digital information recorder 2. More practically, the mechanism controller 48 controls the rotations of the head/tape system, the tape speed, the tracking operation, the loading/unloading operation of the cassette tape, and the tape tension. The motor 50 represents a-plurality of motors that are a drum motor, a capstan motor, a reel motor, a cassette attaching motor, and a loading motor.

Moreover, the digital information recorder 2 has a DC-DC converting circuit 52 that receives a DC voltage from a power supply unit 51 of the tape drive controller 1. The digital information recorder 2 has a position sensor such as a tape end detecting sensor, a time code generating/reading circuit, and so forth (not shown).

Figure 7:
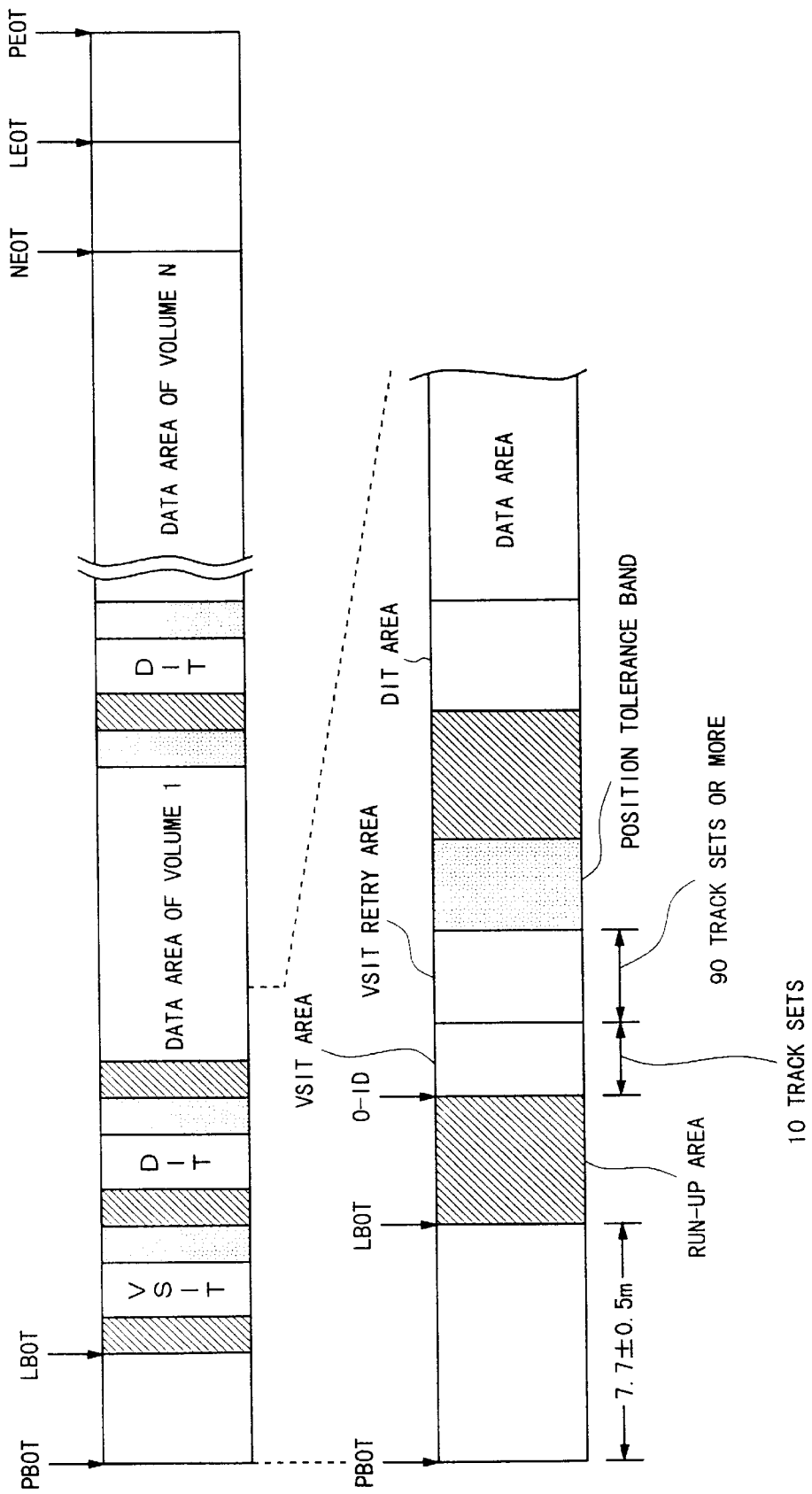
FIG. 7 is a schematic diagram showing a tape format of the tape streamer according to the present invention.

Next, a format in which digital data is recorded will be described. FIG. 7 shows the layout of an entire tape (for example in a cassette). The entire tape is referred to as a physical volume. The tape is connected to a leader tape. The physical beginning end and the physical last end of the tape are referred to as PBOT (Physical Beginning of Tape) and PEOT (Physical End of Tape), respectively. Between the PBOT and PEOT, data can be recorded from an LBOT (Logical Beginning of Tape) and an LEOT (Logical End of Tape). This is because a tape tends to be damaged at the beginning end and last end thereof and error rates at these positions are high. For example, the length of an invalid area between the PBOT and LBOT is defined as 7.7±0.5 m. The length of an invalid area between the PEOT and LEOT is defined as 10 m or more.

To manage one or more logical volumes, a VSIT (Volume Set Information Table) is recorded at the beginning of a record area. The VSIT has information representing the number of volumes recorded on the tape and position information of each logical volume. The position information is a physical ID of a DIT of each of a maximum of 1024 logical volumes.

The position at the beginning of the VSIT is the position of 0-ID. An ID is an address of a position of the tape assigned every four tracks. The ID simply increments from the VSIT area to a DIT area of the last volume. The length of one VSIT is 1-ID. The tape streamer according to the present invention has two types of IDs that are physical ID and logical ID. The physical ID is position information that represents an absolute position of a track set on the tape. The physical ID is equivalent to a time code recorded in the longitudinal direction of the tape. The logical ID is position information that represents a relative position of a track set on the tape. The logical ID is recorded at a predetermined position of a track set. The physical ID and the logical ID of 0-ID at the beginning of the VSIT are both zero.

The logical volume is composed of a DIT (Directory Information Table), a UIT (User Information Table), and a user data area. The DIT has information for managing a file in the logical volume. The length of one DIT is 40-ID. The UIT is optional. The UIT is user intrinsic information for managing a file.

In FIG. 7, hatched areas are run-up areas. The run-up areas servo-lock data tracks. Dotted areas are position guard bands. The position guard bands prevent valid data from being erased when a VSIT or a DIT is updated.

Figure 8A:
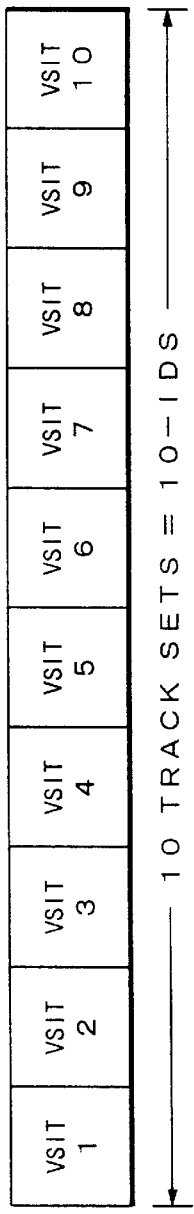
FIG. 8 shows formats of a VSIT and a DIT of the tape streamer according to the present invention.
Figure 10:
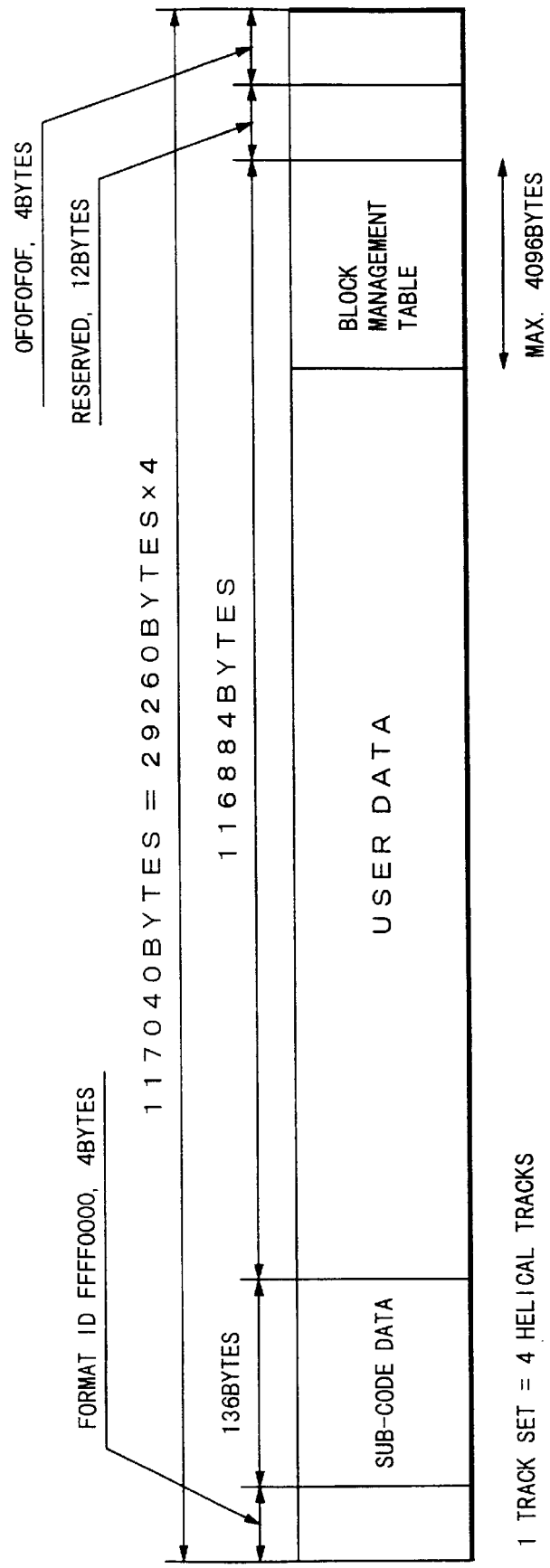
FIG. 10 is a schematic diagram for explaining a logical format of the tape streamer according to the present invention.

To improve the reliability of data, as shown in FIG. 8A, 10 VSITs are successively recorded. Thus, the VSIT area is equivalent to 10 track sets (=10-ID). The VSIT area is followed by a retry area of 90 track sets or more.

Figure 8B:
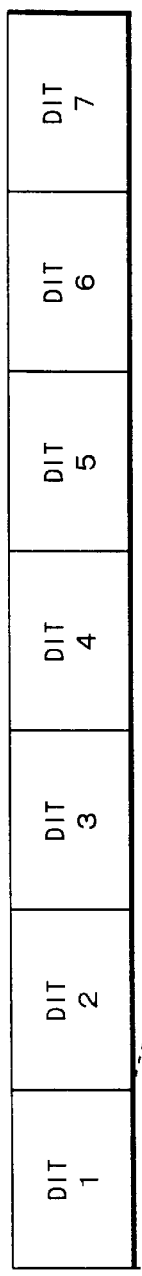
Figure 8C:
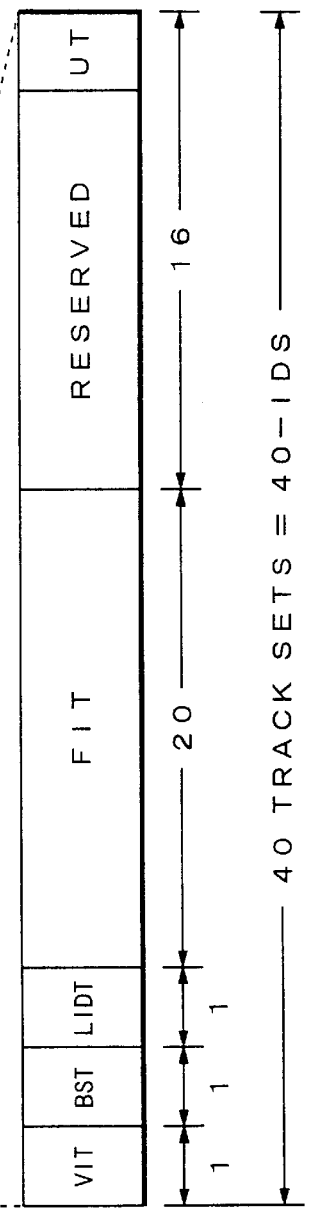

To improve the reliability of data, seven DITs are successively recorded as shown in FIG. 8B. Each DIT is composed of six tables as shown in FIG. 8C. The six tables are a VIT (Volume Information Table), a BST (Bad Spot Table), an LIDT (Logical ID Table), an FIT (File Information Table), an UT (Update Table), and an UIT (User Information Table) that are disposed in the order. The length of each of the VIT, BST, LIDT, and UT is 20-ID. The remaining area of 16-ID is reserved.

Next, each table of the DIT will be described. The ID address of the VIT is the physical ID at the beginning of the volume written to the VSIT. The logical ID is equivalent to the physical ID at the beginning of the volume written to the VSIT. The VIT has position information of the volume such as a volume label, a beginning physical ID of the first data block of the physical volume, and a last physical ID.

Figure 9:
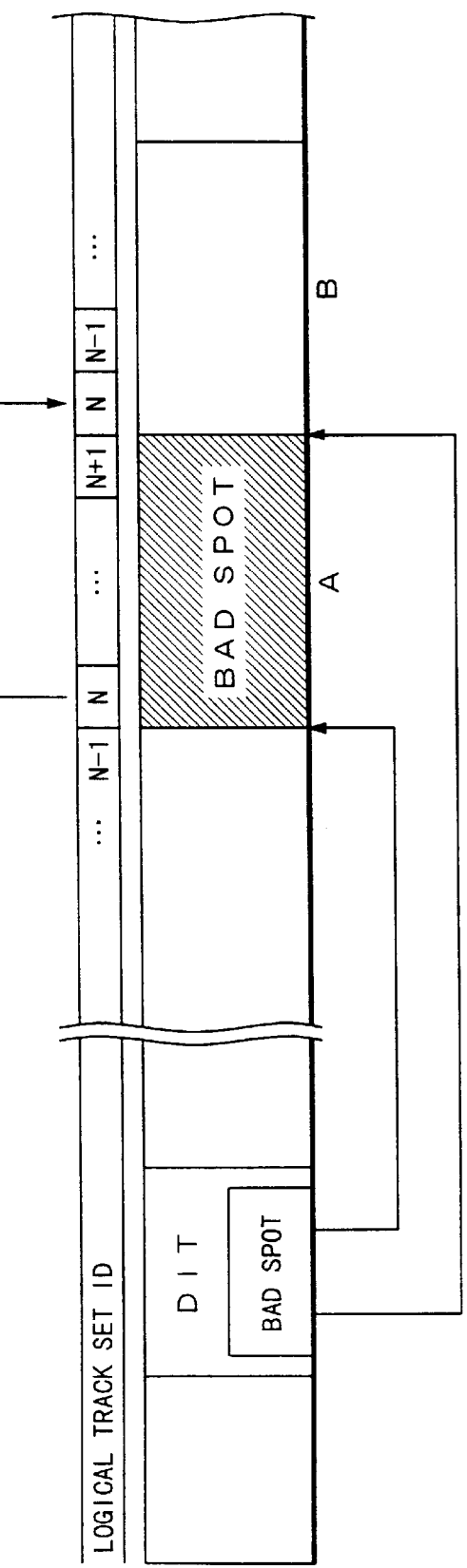
FIG. 9 is a schematic diagram for explaining a BST of the tape streamer according to the present invention.

The ID address of the BST is equivalent to the physical ID of the VIT plus 1. The logical ID of the BST is equivalent to the logical ID of the VIT plus 1. The BST has position information of logically invalid data. The logically invalid data is data that should be treated invalid because data with the same track set ID will be written. For example, as shown in FIG. 9, a shaded region A is logically invalid data. A write retry operation and a write operation corresponding thereto result in logically invalid data. While the write operation is being performed, if an error takes place, the write retry operation is automatically performed and an error location is output. The error location is registered in the BST. While the read operation is performed, the BST represents an invalid region. The logically invalid data is also referred to as a bad spot. The BST manages beginning physical IDs and last end physical IDs of up to 14592 bad spots.

The ID address of the LIDT is equivalent to the physical ID of the VIT plus 2. The logical ID of the LIDT is equivalent to the logical ID of the VIT plus 2. The LIDT is a data table for a high speed block space and a locate operation. In other words, the LIDT includes logical IDs of first to 296-th pointers, physical IDs thereof, a file number, and a first block number of the block management table of the ID data.

The ID address of the FIT is equivalent to the physical ID of the VIT plus 3. The logical ID of the FIT is equivalent to the logical ID of the VIT plus 3. The FIT is composed of a tape mark and a pair of two types of data. The tape mark is a code for delimiting a file. An N-th data pair corresponds to an N-th tape mark of the volume. One pair member of each pair is the physical ID of the N-th tape mark. The other member of each pair is the absolute block number of the N-th tape mark. This value is the absolute block number of the last block that has the same file number as the tape mark. The position of a tape mark can be accurately obtained with the physical ID and absolute block number of the tape mark. Thus, with them, a physical position on the tape can be accessed at high speed.

The ID address of the UT is equivalent to the physical ID of the VIT plus 39. The UT is information that represents whether or not the volume has been updated. Before the volume has been updated, a word (four bytes) that represents the update status of the UT is FFFFFFFFh (where h represents hexadecimal notation). After the volume has been updated, the word is changed to 00000000h.

The UIT is optional. For example, the UIT has an area for 100-ID. The UIT is an user-accessible data table for a user header.

In this example, 1-ID is assigned to each track set composed of four helical tracks. A logical structure of a data block is defined for each track set. FIG. 10 shows a structure of a logical track set. Four bytes at the beginning of the logical track set are used for a format ID that is FFFF0000h.

136 bytes (34 words) that are preceded by the format ID are used for an area for sub-code data. The sub-code data is composed of management information of a track set of the sub-code data. The sub-code includes the above-described tables (such as a VSIT, VIT, BST, user data, and ID codes (for example, a tape mark and an EOD)) so as to identify the track set.

The area of which the area of the block management table is excluded from the area of 116884 bytes is a user data area.

When a track set is a user data write area, if the user data write area is not filled with data of the assigned size, the remaining area is filled with dummy data.

The user data area is followed by a block management table area. The block management table has a maximum of 4096 bytes. The last four bytes of the track set are used for a last end code (0F0F0F0Fh) of the track set. An area preceded by the last end code is used for a reserved area of 12 bytes. The block management table is used to manage the structure of data blocks of user data. There are four types of formats of track sets defined in the user data area (namely, a user data track set for user data, a tape mark (TM) track set representing a tape mark, an EOD (End Of Data) track set, and a dummy track set). A sub-code and a block management table are defined for each format of these track sets.

Figure 11:
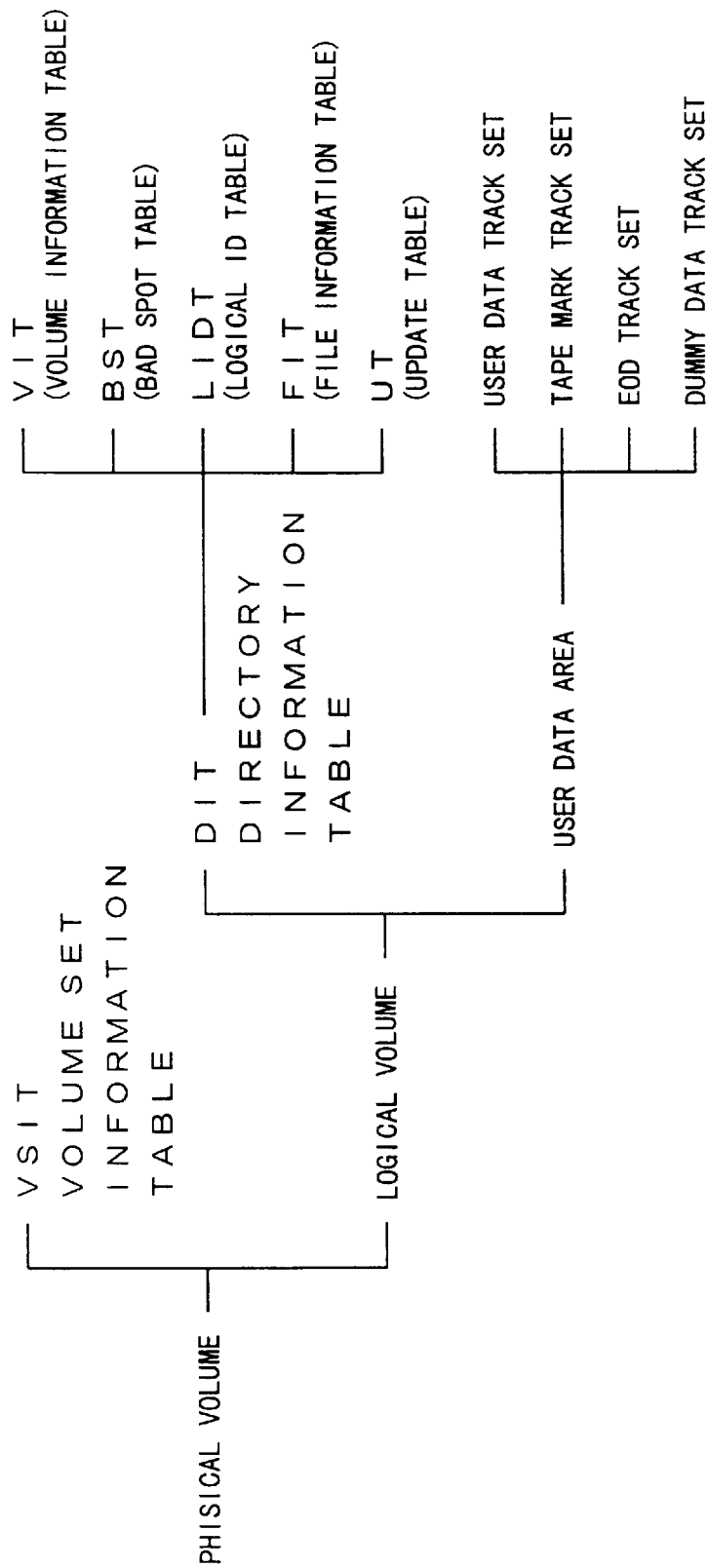
FIG. 11 is a schematic diagram for explaining a format structure of the tape streamer according to the present invention.

FIG. 11 shows logical formats of the above-described tape streamer. A VSIT is recorded for each physical volume such as a tape. A DIT is recorded for each logical volume (partition). The DIT has five tables VIT, BST, LIDT, FIT, and UT. The DIT optionally includes an UIT. The user data area has a user data track set, a tape mark track set, an EOD (End Of Data) track set, and a dummy track set.

Next, the operation of the above-described tape streamer will be described. When a tape is initially used, the tape should be initialized. When the tape is initialized, the VSIT, DIT, and EOD are written to predetermined positions thereof. In addition, dummy data is written to a predetermined position of the tape. Moreover, the physical ID (the above-described time code) simply increments from the LBOT in such a manner that the ID at the beginning end of the VSIT is 0-ID.

When the writing operation for the tape is started, the tape is loaded. After the tape has been inserted, when the button 3 (shown in FIG. 1) is pressed, the loading operation is performed. When the tape is loaded, the VSIT and DIT are read. To stop the reading operation for the tape, the button 3 is pressed. Thus, the tape is unloaded. When the tape is unloaded, the VSIT and DIT are rewritten. The loading operation and the unloading operation may be performed with a command other than the operation of the button 3.

Figure 12:
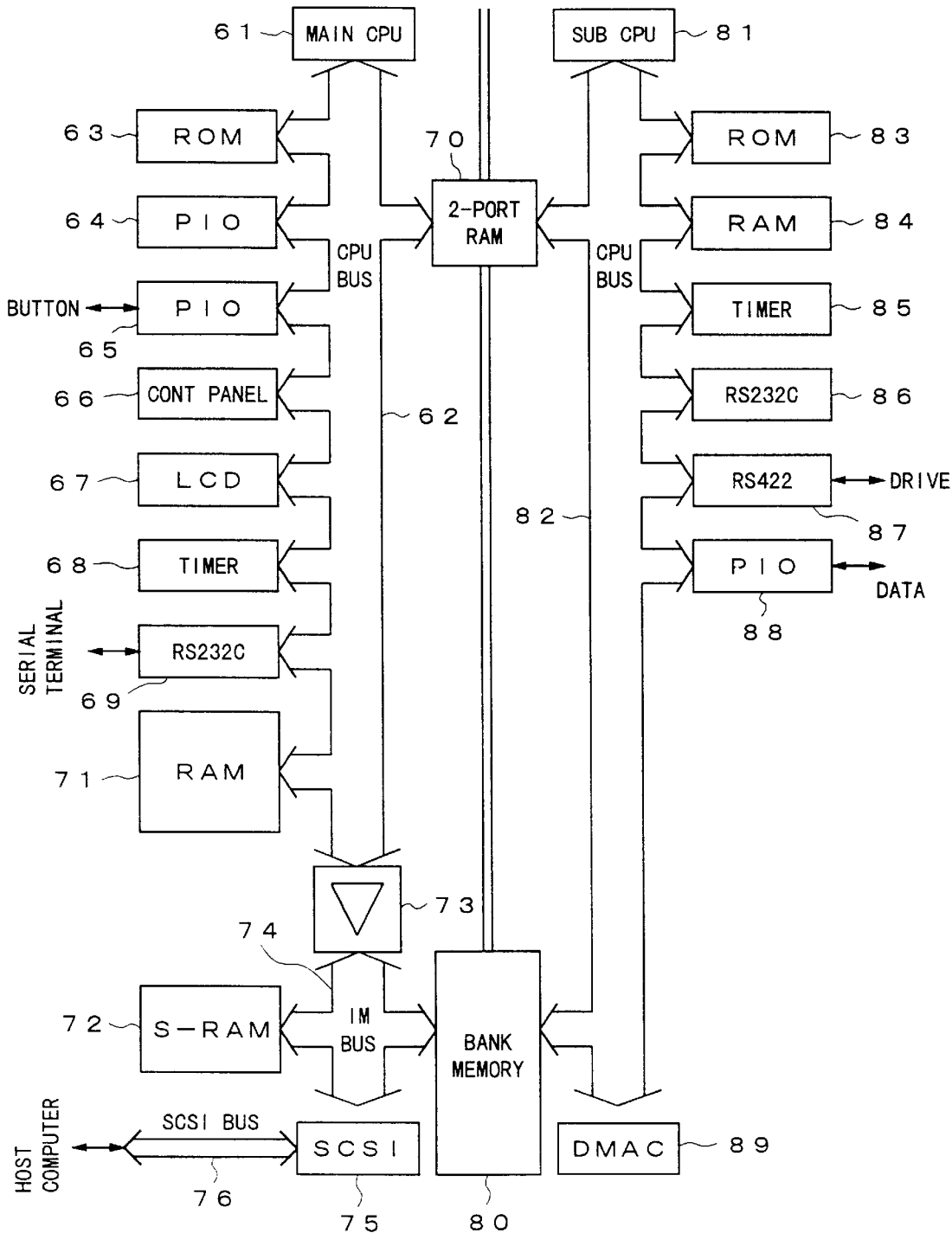
FIG. 12 is a block diagram showing a detailed system structure of the tape streamer according to the present invention.

FIG. 12 shows the detail of the system structure of the tape drive controller 1. Reference numeral 61 is a main CPU. Reference numeral 70 is a two-port RAM. Reference numeral 80 is a bank memory. Reference numeral 81 is a sub CPU. The main CPU 61 is a CPU that manages the entire system. A CPU bus 62 is disposed in association with the main CPU 61. Structural elements are connected to the CPU 62. In other words, a ROM (flash ROM) 63, PIOs (parallel I/Os) 64 and 65, a control panel 66, an LCD 67, a timer 68, an RS232C interface 69, a two-port RAM 70, and an RAM 71 are connected to the CPU bus 62.

The PIO 65 is connected to buttons on the front panel. The LCD 67 is a display unit that displays the operation state of the drive. The RS232C interface 69 is connected to a serial terminal. The RAM 71 has a work RAM area for firmware, a program download area, and a region for temporarily storing header information (VSIT/DIT).

An IM bus 74 is connected to the CPU 62 through a one-way controlling device 73. An S-RAM 72, the bank memory 80, and a SCSI controller 75 are connected to the IM bus 74. A host computer is connected to the SCSI controller 75 through a bus 76. The S-RAM 72 is a RAM that is backed up by a condenser. The S-RAM 72 is a script memory (that stores a control program of the SCSI controller). In addition, the S-RAM 72 is a logger memory that stores data representing the real operation of the system. Since the power of the S-RAM 72 is backed up by the condenser, after the power is turned off, the condenser can store data for around two days.

The two-port RAM 70 stores five types of packets for information communication between the two CPUs 61 and 81. The five types of packets are as follows:

Command transmission packet: A packet used when the CPU 61 causes the CPU 81 to execute an operation.

End status receive packet: A packet used when the CPU 81 informs the CPU 61 of an end status of an operation executed by the CPU 81 corresponding to a command requested by the CPU 61.

Command status: A flag that represents a progress of a command.

Drive management status table: A table used when the CPU 81 informs the CPU 61 of the status of the drive. This table is rewritten by the CPU 81 at predetermined intervals.

Data sent/receive packet: A buffer used when the firmware on the drive (recorder) side is downloaded or when the drive side is self-diagnosed with the serial port of the CPU 61. The bank memory 80 is a buffer memory of the data.

The sub CPU 81 is a CPU that controls the drive. A CPU bus 82 is disposed in association with the sub CPU 81. The bus 82 is connected to a ROM (flash ROM) 83, an RAM (work RAM) 84, a timer 85, an RS232C interface 86, an RS422 interface 87, an PIO (parallel I/O) 88, and a DMA controller 89. In addition, the two-port RAM 70 and the bank memory 80 are connected to the sub CPU 81.

The bank memory 80 is a bank memory that stores data to be written to the tape or data read from the tape. The bank memory 80 has for example eight memory banks that store write data or read data. The DMA (Direct Memory Access) controller 89 is a controller that stores data written to the drive to the bank memory 80. The RS232C interface 86 is used for a self diagnosing operation. The RS422 interface 87 is a communicating means with the drive.

Next, an embodiment of the present invention using the above-described apparatus will be described. In this example, with two apparatuses, data is copied therebetween. According to the present invention, with a block size mismatch error message of the SSI protocol, the block size of data on the source side is obtained.

Figure 13:
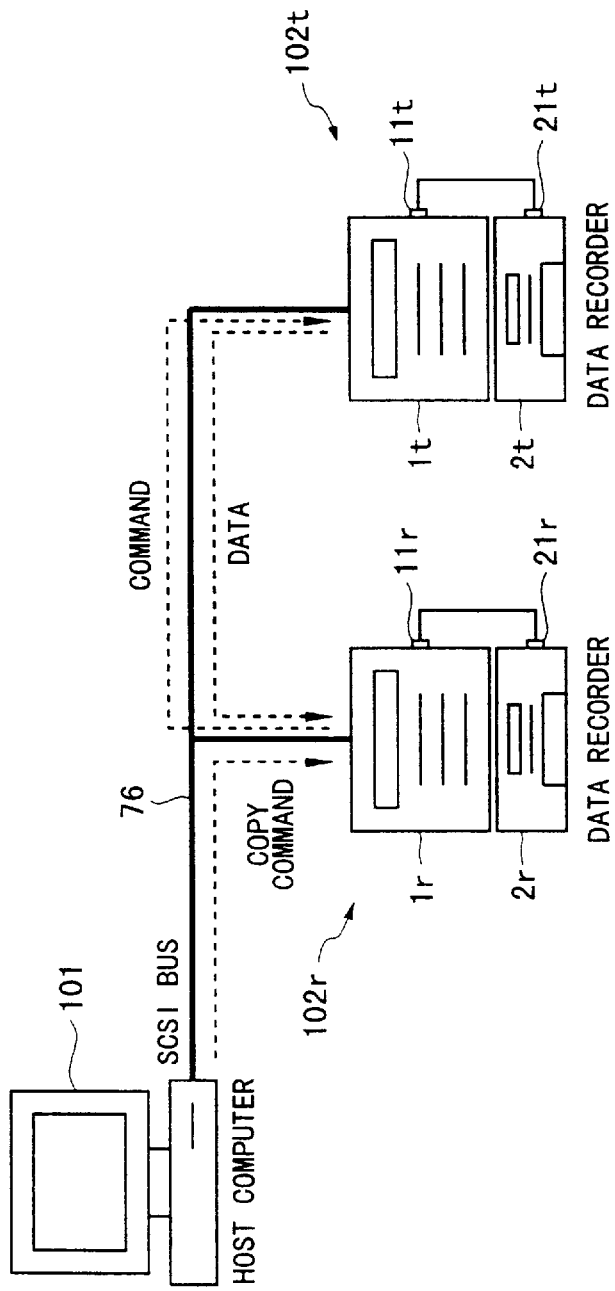
FIG. 13 is a schematic diagram showing an example of the use of the tape streamer according to the present invention.

FIG. 13 shows an example of connections of individual units. A host computer 101, a tape streamer 102*r*, and a tape streamer 102*t* are connected through a SCSI bus 76. The specifications of the tape streamer 102*r* are the same as the specifications of the tape streamer 102*t*. In reality, the SCSI bus is connected to SCSI connectors 14*a* and 14*b* of tape drive controllers 1 of the tape streamers 102*r* and 102*t*, respectively. The tape drive controllers 1*r* and 1*t* and the digital information recorders 2*r* are 2*t* are connected with data input/output connectors 11*r* and 11*t* and data input/output connectors 21*r* and 21*t*, respectively.

A copy command corresponding to the SCSI protocol is issued from the host computer 101 to the destination tape streamer 102*r* through the SCSI bus 76. The tape streamer 102*r* that has received the copy command issues a command corresponding to the SCSI protocol to the source tape streamer 102*t*. Hereinafter, the tape streamer 102*r* is referred to as an initiator.

The destination tape streamer 102*r* that has received the copy command from the host computer issues a read command corresponding to the SCSI protocol to the source tape streamer 102*t*. When the block size of the send request does not accord with the real block size of the source, the difference of the block sizes is sent as an error byte to the destination side that has issued the send request. Thus, the destination tape streamer can determine the size of a block to be sent. Consequently, the destination tape streamer can prepare a required buffer and the like.

Figure 14:
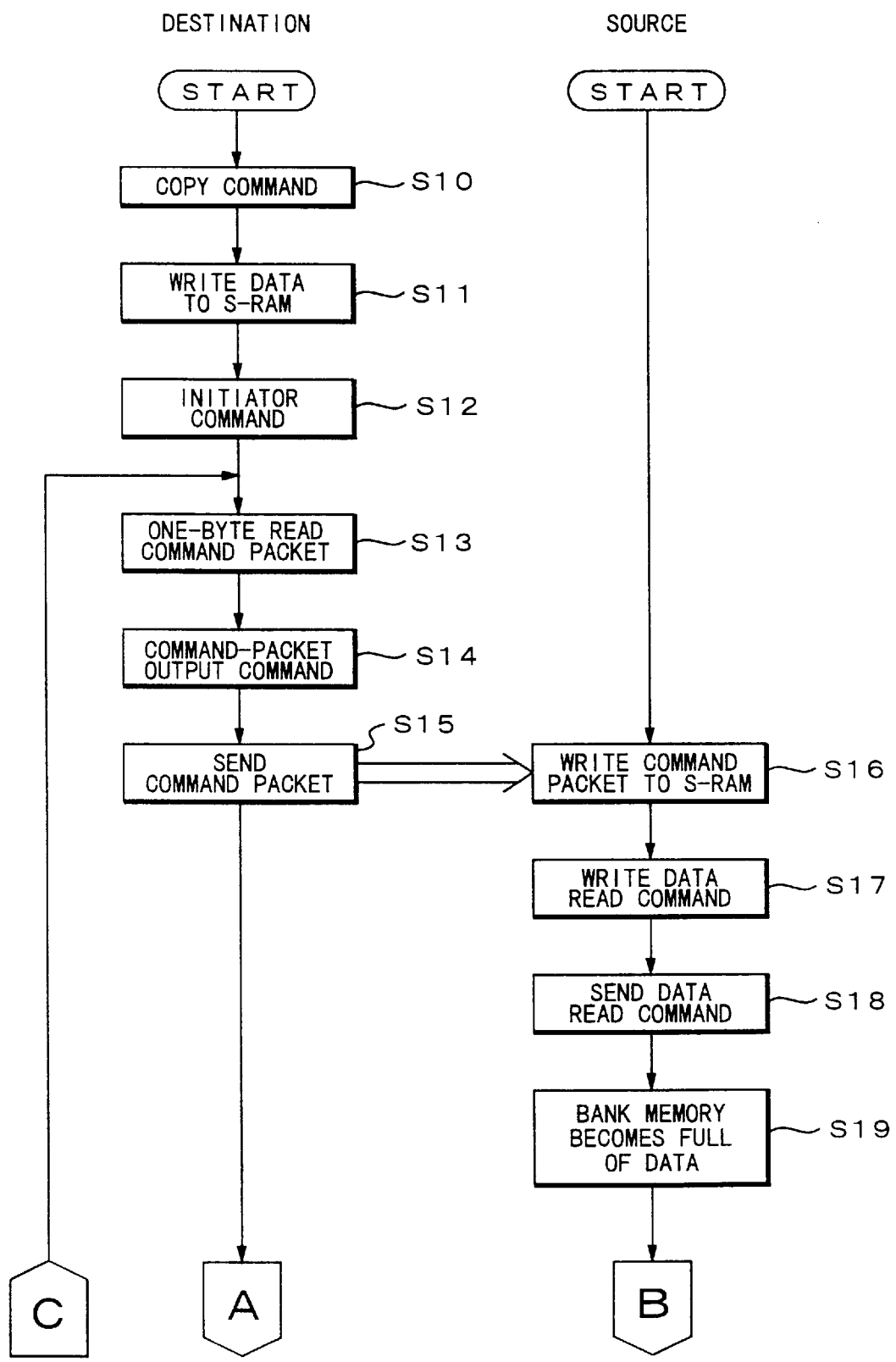
FIG. 14 is a flow chart for explaining a data sending operation corresponding to the present invention.
Figure 15:
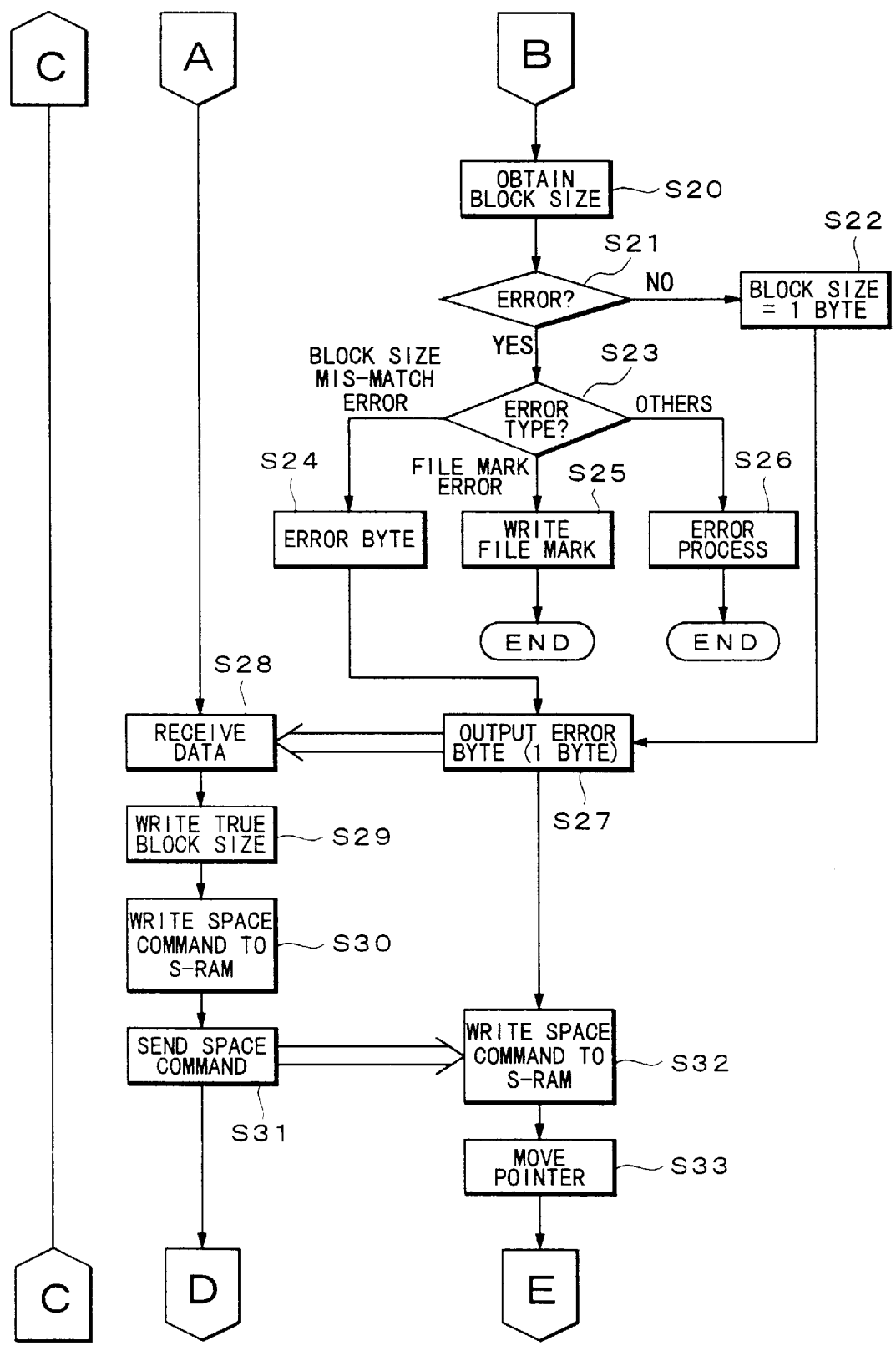
FIG. 15 is a flow chart for explaining the data sending operation corresponding to the present invention.
Figure 16:
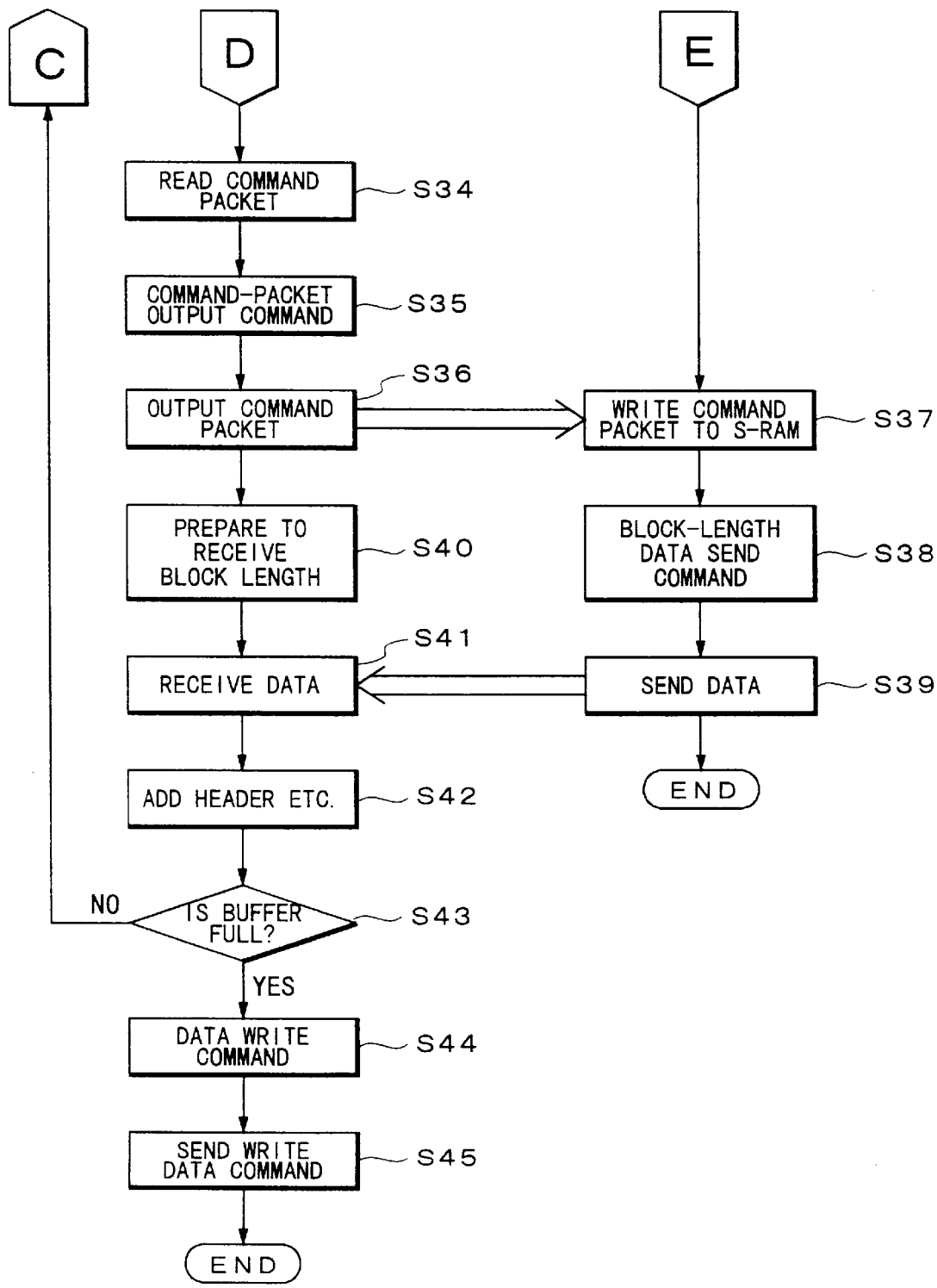
FIG. 16 is a flow chart for explaining the data sending operation corresponding to the present invention.
Figure 20:
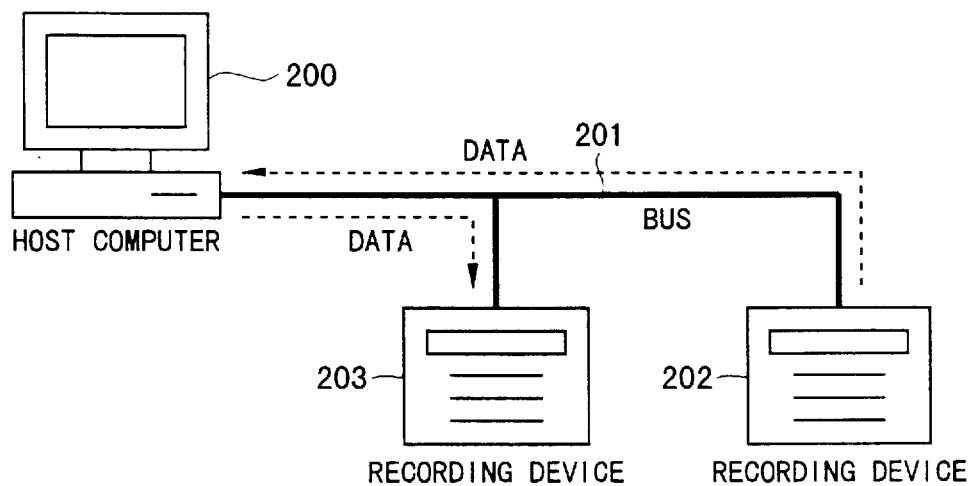
FIG. 20 is a schematic diagram for explaining a copying operation performed between tape streamers.
Figure 21:
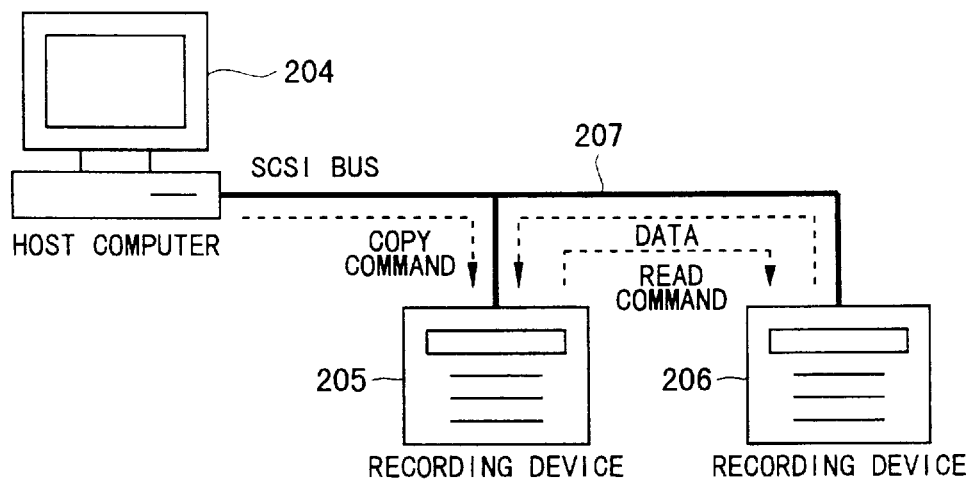
FIG. 21 is a schematic diagram for explaining a copying operation performed between tape streamers.
Figure 22:
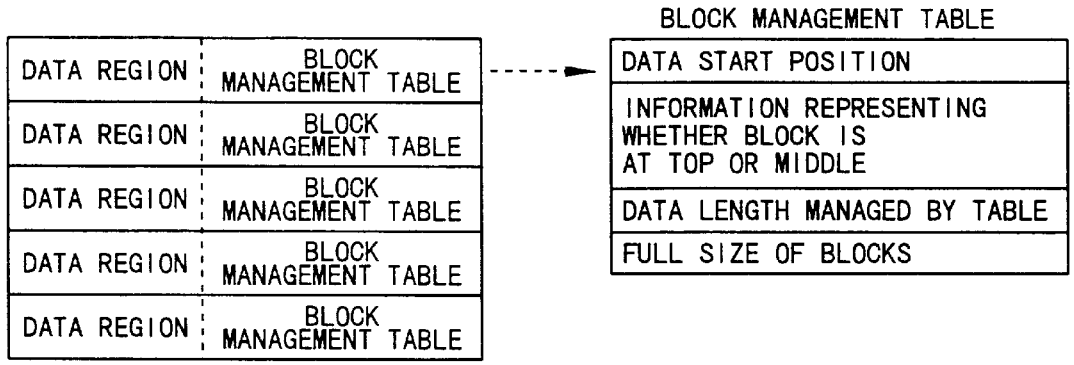
FIG. 22 is a schematic diagram for explaining an outline of a bank memory.
Figure 23:
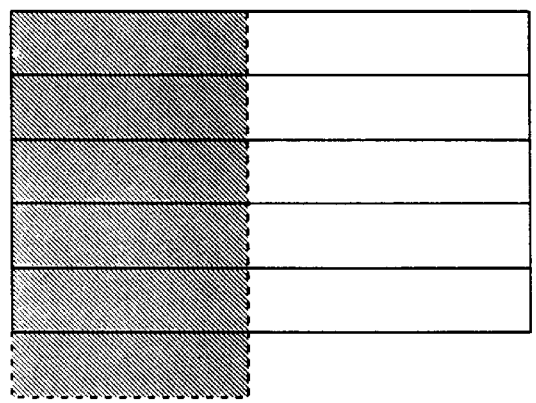
FIG. 23 is a schematic diagram for explaining an outline of the bank memory.
Figure 24:
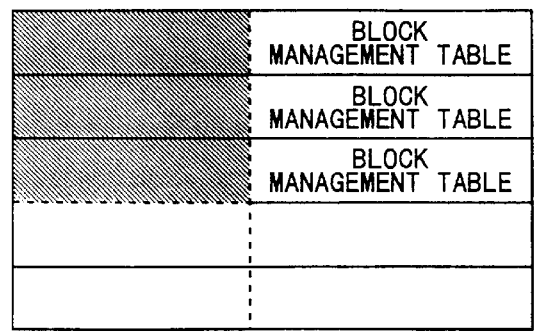
FIG. 24 is a schematic diagram for explaining an outline of the bank memory.

FIGS. 14, 15, and 16 are flow charts showing a copy process according to the embodiment of the present invention. Since the specifications of the tape streamer 102r are the same as the specifications of the tape streamer 102t, similar portions are denoted by similar reference numerals with suffixes r and t.

At step S10, the host computer 101 issues to the tape streamer 102r through the SCSI bus 76 a copy command that causes the copy operation for a file. At this point, the copy destination is the tape streamer 102r and the copy source is the tape streamer 102t. The copy command is written to an S-RAM 72r through a SCSI controller 75r of the tape streamer 102r (at step S11).

The S-RAM 72r is monitored by a main CPU 61r of the tape streamer 102r. When the copy command is written to the S-RAM 72r, the copy command is read by the main CPU 61r. The main CPU 61r that has received the copy command sends to the SCSI controller 75r a command that causes the SCSI controller 754 to operates as an initiator (at step S12).

Thereafter, the main CPU 61r causes the S-RAM 72r to create a one-byte read command packet for reading one byte of data from the source tape streamer 102t (at step S13). The command packet is composed of a single or a plurality of commands that accomplish a particular operation. At step S14, the main CPU 61r sends to the SCSI controller 75r a command that causes the SCSI controller 75r to send the one-byte read command packet to the tape streamer 102t. The command packet is output from the SCSI controller 75r to the SCSI bus 76 (at step S15).

The one-byte read command packet is received by a SCSI controller 75t of the source tape streamer 102t through the SCSI bus 76. The received command packet is written to an S-RAM 72t by the SCSI controller 75t (at step S16) and read by a main CPU 61t. At step S17, the main CPU 61t writes to a two-port RAM 70t a command for reading data from the tape.

The written command is read by a sub CPU 81t and sent to a system controller 46t of the tape drive controller 2t through an RS422 interface 87t. In addition, a command for obtaining data read from the tape is sent to a DMAC 89t (at step S18). Thus, data to be sent is read from the tape of the source tape streamer 102t and written to a bank memory 80t through the DMAC 89t.

Thus, the bank memory 80t stores the one-byte data (at step S19). FIG. 17 shows the state of the bank memory at the point. In such a manner, data including header information and footer information such as sub-code data and block management data is written to the bank memory 80t. The data is read by the sub CPU 81t. With the block size data in the block management table stored in the bank memory, the block size of the data is obtained (at step S20).

At this point, the main CPU 61t determines whether or not the data written to the bank memory 80t by the one-byte read operation has an error corresponding to the SCSI protocol (at step S21). If there is no error, it is determined that the block size of the data is one byte (at step S22). Thereafter, the flow advances to step S27.

If there is an error at step S21, an error code is sent back to the main CPU 61t. Thereafter, the flow advances to step S23. At step S23, the error is categorized corresponding to the error code.

If the error is a block size mis-match error (that takes place when a block that differs from the required block size is read), at the next step S24, the main CPU 61t receives an error byte. The error byte is sent along with an error code when the error is the block size mis-match error. The difference between the read block size and the real block size is sent back to the main CPU 61t. For example, when one-byte read command is executed for a block with a size of 1000 bytes, a value that represents (1−1000=−999 bytes) is sent back to the main CPU 61t. The value is written to the S-RAM 72t. Thereafter, the flow advances to step S27.

When the error is a file mark error (namely, a file mark (tape mark) that represents the last end of the file is detected), the flow advances to step S25. The file mark is written to data stored in the bank memory 80t. The data is sent to the destination tape streamer 102r through the SCSI bus 76 by the SCSI controller 75t and written to a bank memory 80r. Thereafter, the data is written to the tape. As a result, the process sequence corresponding to the copy command is normally completed.

When the error that took place at step S23 is neither the block mis-match error, nor the file mark error, the error is treated as an error of the source tape streamer 102t (at step S26). Thus, the process sequence is abnormally terminated.

When there is no error at step S21 or when the block size mis-match error took place at step S23, the flow advances to step S27. At step S27, the main CPU 61t sends to the SCSI controller 75t a command that causes one byte of the user data area of the data stored in the bank memory 80t to be output to the SCSI bus 76. An error byte that represents the difference between the read size and the real block size and that has been written to the S-RAM 72t is output to the SCSI bus 76. When there is no error at step S21, the error byte is for example 0.

The data that is output from the tape streamer 102t to the SCSI bus 76 is received by the SCSI controller 75r of the tape streamer 102r at step S28. One byte of the data received from the bank memory 80t is written to the bank memory 80r of the tape streamer 102r. The error byte followed by the one-byte data is written to the S-RAM 72r. Thereafter, the flow advances to step S29.

At step S29, the main CPU 61r calculates {1−(value of error byte)} with the error byte stored in the S-RAM 72r and obtains the real size of the block to be sent. In this example, the real block size is calculated as in 1−(−999)=1000 bytes. The obtained value is written to an RAM 71r.

Thereafter, the main CPU 61r writes a "−1" block space command to the S-RAM 72r (at step S30). The space command is a command corresponding to the SCSI protocol. The space command causes an access pointer that represents the position of data to be accessed next to be moved. As described above, in this example, the one-byte read command packet received from the destination tape streamer has caused one byte of the relevant block to be read. Even if one byte of data has been read, it is treated that the block thereof has been read. Thus, the access pointer is moved to the next block. To prevent this problem, a command that causes the access pointer to be moved to the position of one block prior (namely, −1 block) is issued at step S30.

After the "−1" block space command has been written to the S-RAM 72r at step S30, the main CPU 61r sends an output command to the SCSI controller 75r at the next step S31. The SCSI controller 75r that has received the command outputs the command to a SCSI bus 76r. Thereafter, the flow advances to step S34 in the destination tape streamer 102r.

The command received from the destination tape streamer 102r is sent to the SCSI controller 75t of the source command tape streamer 102t. This command is written to the S-RAM 72t (at step S32). The one-byte read command at step S18 has caused the access pointer to be moved to the position of one block prior. At this point, the position of the access pointer has been written to a RAM 71*t* of the source tape streamer 102*t*. The main CPU 61*t* reads the "−1" block space command from the S-RAM 72*t* and rewrites the position of the access pointer stored in the RAM 71*t* to the position of one block prior (at step S33).

On the other hand, the flow advances from step S31 to step S34 in the destination tape streamer 102*r*. The main CPU 61*r* causes the S-RAM 72*r* to create a read command packet in the real block size calculated at step S29. In addition, the main CPU 61*r* sends a command-packet output command to the SCSI controller 75*r* (at step S35). The read command packet is output through the SCSI bus 76 (at step S36).

The read command packet is received by the SCSI controller 75*t* of the source tape streamer 102*t* and written to the S-RAM 72*t* (at step S37). The written command packet is read by the main CPU 61*t*. The main CPU 61*t* sends to the SCSI controller 75*t* a command that causes the SCSI controller 75*t* to output a block of the user data region stored in the bank memory 80*t* (at step S38). The SCSI controller 75*t* that has received the command outputs the data stored in the bank memory 80*t* to the SCSI bus 76 (at step S39).

On the other hand, the main CPU 61 of the destination tape streamer 102*r* sends to the SCSI controller 75*r* a command that causes the SCSI controller 75*r* to obtain a block of data (at step S40). The SCSI controller 75*r* that has received the command obtains data that has been output from the source tape streamer 102*t* through the SCSI bus 76 (at step S41). The received data is written to the bank memory 80*r*. Predetermined header information and header information such as a block management table and a format ID are written to the data stored in the bank memory 80*r* corresponding to the format used in the destination tape streamer 102*r* (at step S42).

At step S43, it is determined whether or not the bank memory 80*t* is filled with predetermined data. If the bank memory 80*t* is not filled with the predetermined data, the flow returns to step S13. From step S13, the above-described process sequence is repeated. If the bank memory 80*t* is filled with the predetermined data, a command for writing data to the tape is written to a two-port RAM 70*r* (at step S44). The written command is read by a sub CPU 81*r* at step S45. A data write command is sent to a system controller 46*r* of the tape drive controller 1*r* through an RS422 interface 87*r*. In addition, data stored in the bank memory 80*r* is sent to a drive controller 34*r* through a PIO interface 88*r*. A predetermined signal process is performed for the data and then the resultant data is written to the tape. As a result, the copy process sequence is completed.

In this case, the present invention is not limited to the above-described source tape streamer 102*t*. Instead, the present invention can be applied for any sequential device corresponding to the SCSI system.

In the above-described embodiment, the copy command is sent from the host computer 101. However, the copy command many be input from a control panel 66*r* or an external device through an RS-232C terminal 69*r*.

Moreover, in the above-described embodiment, one byte of data is read to obtain the size of a block to be sent. However, the size of the block is not limited to one byte. Instead, any size of data may be read. However, from the viewpoint of the processing speed, a small block size is preferable.

Furthermore, in the above-described embodiment, the block size is obtained with the error byte received corresponding to the read command. However, a command that causes the block size to be directly returned may be used. In this case, the error determining steps from step S21 to S23 can be simplified.

Next, a modification of the present invention will be described. In the above-described embodiment, to maintain a block image to be copied, a variable length block on the source side is treated as a variable length block on the destination side. As a modification of this method, a variable length block on the source side may be converted into a fixed length block on the destination side.

First of all, the destination tape streamer 102*r* as an initiator sends a copy command with a fixed block size assigned by the host computer 101. Thereafter, the destination tape streamer 102*r* reads one byte of a block to be sent and thereby obtains the block size. Consequently, when the assigned block size is a fixed length block, the remainder of the fixed length block against the size of a file to be copied can be detected.

The tape streamer 102*r* causes the tape streamer 102*t* to send a block with the size assigned by the host computer 101. In such a manner, a block is sent from the tape streamer 102*t* to the tape streamer 102*r*. At this point, if the size of the file to be copied is not divided by the assigned block size, when the last block is sent, a remaining region takes place.

As described above, since the size of the file to be copied is known by the one byte read operation, data with the size of the remaining region is created with a pattern assigned by for example the host computer 101 beforehand. The remaining region is filled with such data. FIG. 18 shows the state of blocks of which data is sent in such a manner. As shown in FIG. 18A, files 140 and 141 composed of variable length blocks are converted into files 140' and 141' composed of fixed length blocks as shown in FIG. 18B.

According to the modification, in addition to a conversion from a variable length block into a fixed length block, a copy operation for converting a fixed length block in a particular size into a fixed length block in another size can be performed.

Next, another modification of the present invention will be described. In the above-described embodiment, when a file is copied, the file on the source side is copied in the same block order on the destination side. However, in this modification, blocks can be sent in any sequence and the file can be edited block by block.

For example, as shown in FIG. 19A, the case of which a file is composed of any selected blocks of sequential files 150 and 151 will be described. The file 150 is composed of three blocks that are blocks 150*a*, 150*b*, and 150*c*. The block 151 is composed of four blocks that are blocks 151*a*, 151*b*, 151*c*, and 151*d*. The block 150*b* of the file 150, the block 151*d* of the file 151, and the blocks 151*a* and 151*b* of the file 151 are edited so as to form a new file.

First, the host computer 101 sends a copy command to the destination tape streamer 102*r* as an initiator. At this point, as shown in FIG. 19C, the copy command includes file editing information such as a file number, a block number, and the number of blocks.

The file number represents of a file to be edited. The file number is counted from a predetermined position. When a file name has been assigned, it may be used. Now, assume an example that the file numbers of the files 150 and 151 are 1 and 2, respectively. The block number represents a block to be edited in a file assigned by the file number. The block number is counted from the first block. The number of blocks represents of blocks to be edited. The blocks are counted from a block assigned by a block number.

When a plurality of files on the source side. are edited, as shown in FIG. 19C, information corresponding to the files is sent.

When the host computer 101 sends the copy command to the tape streamer 102r, the tape streamer 102r as the initiator causes the source tape streamer 102t to send block data. Thus, data for one block with block number 2 of file number 1 is sent and written to the bank memory 80r of the tape streamer 102r. In addition, the predetermined header information and footer information such as the block management table are written to the data. Thereafter, in the order of commands, data for one block with block number 4 of file number 2 is sent to the tape streamer 102r and written to the bank memory 80r. Next, data for two blocks starting from block number 1 of file number 2 is sent to the tape streamer 102r and written to the bank memory 80r. Thereafter, the header information and so forth are written to the data stored in the bank memory 80r.

In such a manner, the files 150 and 151 on the source side are copied block by block and written to the bank memory 80r of the tape streamer 102r and structured as a new file 152 as shown in FIG. 19B.

As described above, according to the present invention, by executing a one-byte read command on the source side, the size of blocks to be copied can be known. Thus, even if block data that is larger than the capacity of the bank memory is sent, the block management table can be created.

Thus, a block image on the source side can be completely copied. In addition, even after the copy operation is performed, no problem takes place in an application with the block size.

According to a modification of the present invention, when a particular recording device processes data with a block length exceeding a predetermined range, the block is converted into a fixed length block that the device can handle. Thus, the recording device can use conventional data.

Moreover, according to another modification of the present invention, data to be copied can be edited block by block without an intervention of the host computer. Thus, since the host computer performs another process, the computer resource can be effectively used.

We claim:

1. digital data copying apparatus for use with a host computer coupled to a plurality of tape streamers for recording/reproducing digital data, each tape streamer comprising a memory having units for storing respective blocks of said digital data and a tape medium for storing said digital data, the apparatus comprising:
   a first tape streamer of said tape streamers for receiving a copy command from said host computer and, responsive to said copy command, generates a command packet;
   a second tape streamer of said tape streamers for receiving said command packet from said first tape streamer, for reproducing said blocks of said digital data from said tape medium of said second tape streamer and storing the reproduced blocks to respective units of said memory of said second tape streamer in response to receiving said command packet, and for sending to said first tape streamer information indicating a difference in memory size between a particular unit of said memory of said second tape streamer and a respective block of said digital data reproduced from said tape medium of said second tape streamer; and
   wherein said first tape streamer stores said digital data reproduced from said second tape streamer in said memory of said first tape streamer in accordance with said information indicating said difference in memory size.

2. The digital data copying apparatus of claim 1, wherein said first tape streamer comprises means for preparing a storage area in said memory of said first tape streamer for storing said digital data overflowing said particular unit of said memory in accordance with said information indicating said difference in memory size.

3. The digital data copying apparatus of claim 2, wherein said digital data to be copied from said second tape streamer to said first tape streamer is one block of data.

4. The digital data copying apparatus of claim 1, wherein said first tape streamer and said second tape streamer each have a central processing unit, wherein said central processing unit of said first tape streamer generates said command packet and said central processing unit of said second tape streamer receives said command packet.

5. The digital data copying apparatus of claim 1, wherein said first tape streamer and said second tape streamer each have a main central processing unit and a sub central processing unit, wherein said command packet is received by said main central processing unit of said second tape streamer and, in response to said command packet, sends control information for reproducing said digital data from said tape medium to said sub central processing unit of the second tape streamer.

6. The digital data copying apparatus of claim 5, wherein said command packet is sent from said main central processing unit of said first,tape streamer to said main central processing unit of said second tape streamer.

7. The digital data copying apparatus of claim 5, wherein said sub central processing unit of both said first tape streamer and said second tape streamer are adapted to control reproducing/recording said digital data to/from said tape medium.

8. The digital data copying apparatus of claim 5, wherein said memory of each first tape streamer and second tape streamer comprise a bank memory, wherein said bank memory of said second tape streamer temporarily stores said digital data reproduced from said tape medium of said second tape streamer, wherein said bank memory of said first tape streamer temporarily stores said digital data reproduced and stored by said second tape streamer.

9. The digital data copying apparatus of claim 1, wherein said first and second tape streamers are tape drives external to said host computer and separate from each other.

10. A digital data copying method for recording/reproducing digital data from a plurality of tape streamers coupled to a host computer, each tape streamer comprising a memory having units for storing respective blocks of said digital data and a tape medium for storing said digital data, the method comprising the steps of:
   sending a copy command from said host computer to a first tape streamer of said tape streamers;
   sending a command packet in response to said copy command to a second tape streamer of said tape streamers;
   reproducing said blocks of said digital data from said tape medium of said second tape streamer in response to receiving said command packet;
   storing the reproduced blocks to respective units of said memory of said second tape streamer;
   sending to said first tape streamer information indicating a difference in memory size between a particular unit of said memory of said second tape streamer and a respective block of said digital data reproduced from said tape medium of said second tape streamer; and
   storing said digital data reproduced from said second tape streamer in said memory of said first tape streamer in accordance with said information indicating said difference in memory size.

11. The digital data copying method of claim 10, wherein said copy command includes a block size assignment command for fixing the amount of data of one block of said digital data; further comprising the step of copying a file of said digital data having variable block sizes which is reproduced by said second tape streamer to a file of said digital data having fixed block sizes in said memory of said first tape streamer.

12. The digital data copying method of claim 10, wherein said copy command includes a plurality of file numbers representing an order of said blocks to be copied and included in said files of a plurality of blocks; further comprising the step of copying a respective file from said second tape streamer to said first tape streamer in a different order than represented by a respective file number.

13. A digital data copying apparatus having tape streamers for recording digital data processed by a computer or reproducing digital data so as to directly send/receive the digital data to/from the computer, the apparatus comprising:

a host computer;

a first tape streamer for receiving from the host computer a copy command for data to be copied; and a second tape streamer for receiving from said first tape streamer a command for sending a relatively small amount of data, the minimum unit of the relatively small amount of data being one byte;

wherein said second tape streamer comprises means for sending information of the difference between the amount of data to be copied and the relatively small amount of data to said first tape streamer;

wherein said first tape streamer comprises means for detecting the amount of data to be copied corresponding to the information of the difference and means for preparing a storage area for storing the detected amount of data;

wherein said first tape streamer is adapted for sending a send command to said second tape streamer so that said second tape streamer sends the data to be copied to said first tape streamer;

wherein the data to be copied is one block of data;

wherein said first tape streamer and said second tape streamer each have a central processing unit, the send command being sent from the central processing unit of said first tape streamer to the central processing unit of said second tape streamer; and wherein the central processing unit of each of said first tape streamer and said second tape streamer is composed of a main CPU and a sub CPU, the send command being received by the main CPU of said second tape streamer, the main CPU of said second tape streamer being adapted for sending control information for reading the data to be copied to the sub CPU of said second tape streamer.

14. The digital data copying apparatus having the tape streamers as set forth in claim 13, wherein the send command is sent from the main CPU of said first tape streamer to the main CPU of said second tape streamer.

15. The digital data copying apparatus having the tape streamers as set forth in claim 14, wherein the sub CPU of each of said first tape streamer and said second tape streamer is adapted for controlling a recording/reproducing operation of a tape shaped record medium of the respective tape streamer.

16. The digital data copying apparatus having the tape streamers as set forth in claim 15, wherein each of said first tape streamer and said second tape streamer has a bank memory, the bank memory of said second tape streamer being adapted for temporarily storing the data to be copied reproduced from the record medium so that the data is sent with the send command and sending the data to said first tape streamer and wherein the bank memory of said first tape streamer is adapted for temporarily storing the data to be copied so as to record the data to the tape shaped record medium of said first tape streamer.

17. A digital data copying system, comprising:

a host computer;

a first tape streamer for receiving from the host computer a copy command for data to be copied; and a second tape streamer for receiving a send command from said first tape streamer and, in response thereto, for sending an amount of data smaller than that of the data to be copied, said second tape streamer having means for sending information of the difference between the amount of data to be copied and the smaller amount of data wherein each of said first tape streamer and said second tape streamer include a main CPU and a sub CPU, the main CPU of said second tape streamer sending control information for reading the data to be copied to the sub CPU of said second tape streamer.

18. The digital data copying apparatus according to claim 17, wherein said first tape streamer includes means for detecting the amount of data to be copied and means for storing the detected amount of data.

19. A digital data copying apparatus operable with a host computer and at least one tape streamer, said apparatus comprising;

means for receiving a send command from a respective tape streamer for requesting an amount of data and, in response thereto, for sending an amount of data smaller than that of the requested data to the respective tape streamer; and means for sending information of the difference between the requested data and the smaller amount of data further comprising a main CPU and a sub CPU, the main CPU being adapted for sending control information for reading the data to be copied to the sub CPU.

* * * * *